(12) United States Patent
Kuragaki

(10) Patent No.: US 12,084,137 B2
(45) Date of Patent: Sep. 10, 2024

(54) STEERING CONTROL APPARATUS

(71) Applicant: HITACHI ASTEMO, LTD., Hitachinaka (JP)

(72) Inventor: Satoru Kuragaki, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 346 days.

(21) Appl. No.: 17/637,765

(22) PCT Filed: Sep. 25, 2020

(86) PCT No.: PCT/JP2020/036250
§ 371 (c)(1),
(2) Date: Feb. 23, 2022

(87) PCT Pub. No.: WO2021/065714
PCT Pub. Date: Apr. 8, 2021

(65) Prior Publication Data
US 2022/0315105 A1 Oct. 6, 2022

(30) Foreign Application Priority Data

Oct. 3, 2019 (JP) .................................. 2019-182855

(51) Int. Cl.
*B62D 5/04* (2006.01)
*B62D 5/00* (2006.01)
*B62D 6/00* (2006.01)

(52) U.S. Cl.
CPC ............. *B62D 6/008* (2013.01); *B62D 5/008* (2013.01); *B62D 5/0481* (2013.01)

(58) Field of Classification Search
None
See application file for complete search history.

(56) References Cited

U.S. PATENT DOCUMENTS

2022/0009546 A1* 1/2022 Mori ...................... B62D 5/049

FOREIGN PATENT DOCUMENTS

JP           4403791 B2 *  1/2010
JP       2010-149687 A    7/2010

OTHER PUBLICATIONS

International Search Report and English translation in International Application PCT/JP2020/036250 dated Oct. 9, 2020.
Written Opinion and English translation in International Application PCT/JP2020/036250 dated Oct. 9, 2020.

* cited by examiner

*Primary Examiner* — Jonathan M Dager
*Assistant Examiner* — Laura E Linhardt
(74) *Attorney, Agent, or Firm* — FOLEY & LARDNER LLP

(57) ABSTRACT

An actual steering ratio, which is a linkage relationship between a steering target wheel and a steering wheel, is controlled based on a setting steering ratio. Then, when a "mismatch" occurs between the actual steering ratio and the setting steering ratio due to an emergent avoidance motion, a steering control apparatus corrects the setting steering ratio using a corrected steering ratio so as to reduce the "mismatch", thereby improving the consistency of the linkage relationship between a driver's steering operation and the steering target wheel, allowing the relationship between a rotational angle of the steering wheel and a steering angle of the steering target wheel to match the steering ratio, and thus reducing an uncomfortable feeling evoked in a driver.

9 Claims, 11 Drawing Sheets

STEERING CONTROL APPARATUS

TECHNICAL FIELD

The present invention relates to a steering control apparatus mounted on an automobile, and, in particular, to a steering control apparatus in which a steering operation shaft and a steering mechanism are mechanically disconnected from each other.

BACKGROUND ART

One known type of steering control apparatus for an automobile (hereinafter referred to as a vehicle) is a so-called steer-by-wire steering control apparatus, which disconnects a steering operation shaft and a steering mechanism, detects a rotational angle, a rotational direction, and the like of the steering operation shaft, and controls an operation amount of a steering actuator based on these detection signals, thereby driving a steering shaft.

The steer-by-wire steering control apparatus allows the corresponding relationship between a steering operation amount of a steering wheel and the steering amount of the steering electric actuator to be set without being subjected to mechanical constraints, thereby having an advantage of being able to flexibly accommodate to a change in the steering characteristics according to a running state of a vehicle such as a high or low vehicle speed of the vehicle, a long or short turning radius, and the presence or absence of acceleration/deceleration of the vehicle to thus improve the design flexibility thereof. The steer-by-wire steering control apparatus has many advantages compared to conventional steering control apparatuses, such as further having an advantage of being able to be easily developed into an autonomous steering system such as lane keeping control.

A reaction force electric actuator for applying a steering reaction force to the steering wheel is mounted on the steering operation shaft side disconnected from the steering mechanism, and the steer-by-wire steering control apparatus is configured to allow a driver to perform a steering operation while feeling as if the steering wheel and the steering mechanism are mechanically coupled by applying an adequate steering reaction force to the steering wheel.

Then, when the driver runs the vehicle while holding the steering wheel in his/her hand, the driver may be unaware of the presence of an obstacle in front of or behind the vehicle, and this case leads to the occurrence of a collision with the obstacle. Therefore, when detecting the obstacle using an in-vehicle camera, an in-vehicle radar, or the like, the steering control apparatus equipped with the autonomous steering system is configured to perform an emergent avoidance operation for avoiding the collision by largely steering a steering target wheel (or a wheel to be turned) using the steering mechanism independently of the steering wheel operated by the driver.

Generally, the steering actuator includes a steering electric motor and the reaction force actuator includes a reaction force electric motor, and the reaction force electric motor and the steering electric motor are set to a predetermined "setting steering ratio" and controlled so as to operate in conjunction with each other. Now, regarding the steering ratio, the "steering ratio" is defined to refer to the ratio of an amount corresponding to a change in the steering angle of the steering target wheel to an amount corresponding to a change in the rotational angle of the steering wheel, and is expressed as the "steering ratio=the rotational angle of the steering electric motor/the rotational angle of the reaction force electric motor". The relationship between the rotational angle of the steering wheel and the steering angle of the steering target wheel is determined by that.

Therefore, when the autonomous steering system largely steers the steering target wheel by increasing the rotational angle of the steering electric motor to perform the emergent avoidance operation, the rotational angle of the reaction force electric motor is also increased to largely rotate the steering wheel so as to match the setting steering ratio in conjunction therewith. As a result, the driver feels uncomfortable or unpleasant because the steering wheel held by his/her hand is largely and abnormally rotated regardless of his/her intention.

With the aim of solving such a problem, for example, Japanese Patent Application Public Disclosure No. 2010-149687 (PTL 1) discusses estimating a road surface reaction force corresponding to an autonomous steering instruction value (a steering instruction value for avoiding a collision) generated by autonomous steering control and applying a steering reaction force equivalent to a reaction force difference calculated by subtracting the estimated road surface reaction force from an actual road surface reaction force to a steering wheel.

PTL 1 does not reflect the road surface reaction force emerging due to the autonomous steering instruction value in the reaction force electric motor as the steering reaction force in this manner, thereby preventing the steering reaction force based on the autonomous steering instruction value from being applied to the steering wheel, and thus reducing the rotation of the steering wheel and evoking no uncomfortable or unpleasant feeling in the driver.

CITATION LIST

Patent Literature

PTL 1: Japanese Patent Application Public Disclosure No. 2010-149687

SUMMARY OF INVENTION

Technical Problem

However, the steering control apparatus configured as disclosed in PTL 1 provides the steering reaction force to the reaction force electric motor so as to eliminate the influence of the autonomous steering under a state that the steering target wheel is autonomously steered, and therefore may fall into a state that the rotational angle of the steering wheel is inconsistent with the steering angle of the steering target wheel.

This means that, although the rotational angle of the steering wheel and the steering angle of the steering target wheel before the autonomous steering control is performed are determined based on the preset steering ratio, the rotational angle of the steering wheel fails to correspond to the set steering ratio with respect to the steering angle of the steering target wheel after the autonomous steering control is performed.

Therefore, for example, even if the driver rotates the steering wheel to a neutral position (a straight running state), the steering electric motor is rotated according to the set steering ratio, and therefore the steering target wheel cannot fully return to the neutral position (the straight running state), and the driver starts to feel uncomfortable due to a mismatch between the steering operation on the steering wheel and the steering direction (the running direction) of the vehicle.

An object of the present invention is to provide a novel steering control apparatus capable of allowing a steering operation on a steering wheel and a running direction of a vehicle to match each other along with preventing an abnormal rotation of the steering wheel due to autonomous steering control.

Solution to Problem

According to one aspect of the present invention, a steering control apparatus includes a steering operation shaft configured to be rotated according to a rotation of a steering wheel and mechanically disconnected from a steering target wheel, a reaction force actuator configured to apply a steering reaction force to the steering operation shaft, a steering actuator configured to generate a steering force for steering the steering target wheel, a steering member configured to transmit the steering force of the steering actuator to the steering target wheel to steer the steering target wheel, a steering operation amount sensor configured to detect a steering operation amount of the steering operation shaft and output a steering operation amount signal, which is a signal regarding the steering operation amount, a steering amount sensor configured to detect a steering state of the steering target wheel and output a steering amount signal, which is a signal regarding the steering state, and a control device configured to drive and control the reaction force actuator and the steering actuator based on at least the signals detected by the steering operation amount sensor and the steering amount sensor. The control device includes at least an external steering instruction value reception portion, a setting steering ratio generation portion, a steering instruction value generation portion, a reaction force instruction value generation portion, and a setting steering ratio correction portion. The external steering instruction value reception portion receives an external steering instruction value generated according to a driving situation of a vehicle. The setting steering ratio generation portion generates a setting steering ratio, which is a ratio of a change amount of the steering amount to a change amount of the steering operation amount, based on a vehicle speed. The steering instruction value generation portion generates a steering instruction value for driving and controlling the steering actuator based on the external steering instruction value, a basic steering instruction value based on the steering operation amount, and the setting steering ratio. The reaction force instruction value generation portion generates a reaction force instruction value for driving and controlling the reaction force actuator based on a damped steering amount determined by multiplying the steering amount that is actually acquired by a predetermined damping coefficient, or a damped steering amount determined by subtracting a part of an amount corresponding to a change in the steering amount corresponding to the external steering instruction value or a whole of the amount corresponding to the change in the steering amount corresponding to the external steering instruction value from the steering amount that is actually acquired. If a mismatch occurs between an actual steering ratio determined based on the steering instruction value and the reaction force instruction value and the setting steering ratio when the reaction force instruction value generation portion generates the reaction force instruction value, the setting steering ratio correction portion corrects the setting steering ratio to a corrected steering ratio based on the actual steering ratio so as to reduce this mismatch.

Advantageous Effects of Invention

According to the one aspect of the present invention, the abnormal rotation of the steering wheel is prevented by, when the steering target wheel is largely steered due to the autonomous steering control, not reflecting this steering amount of the steering target wheel in the steering reaction force of the reaction force electric actuator. Further, when the "mismatch" occurs between the actual steering ratio and the setting steering ratio due to the autonomous steering control, the consistency between the driver's steering operation and the running direction of the vehicle can be improved by correcting the setting steering ratio based on this "mismatch".

DESCRIPTION OF EMBODIMENTS

In the following description, embodiments of the present invention will be described in detail with reference to the drawings, but the present invention is not limited to the embodiments that will be described below and the range thereof also includes various modification examples and application examples within the technical concept of the present invention.

First Embodiment

The configuration of a steer-by-wire steering control apparatus will be described before specific embodiments of the present invention will be described.

First, the steer-by-wire steering control apparatus will be described. The steer-by-wire steering control apparatus disconnects a steering operation shaft from a steering shaft, detects a rotational angle, a disturbance torque, and the like of the steering operation shaft using a rotational angle sensor, a current sensor, and the like, and controls an operation amount of a steering actuator based on these detection signals to drive the steering shaft. The configuration of a steering mechanism will be described below.

Figure 1:
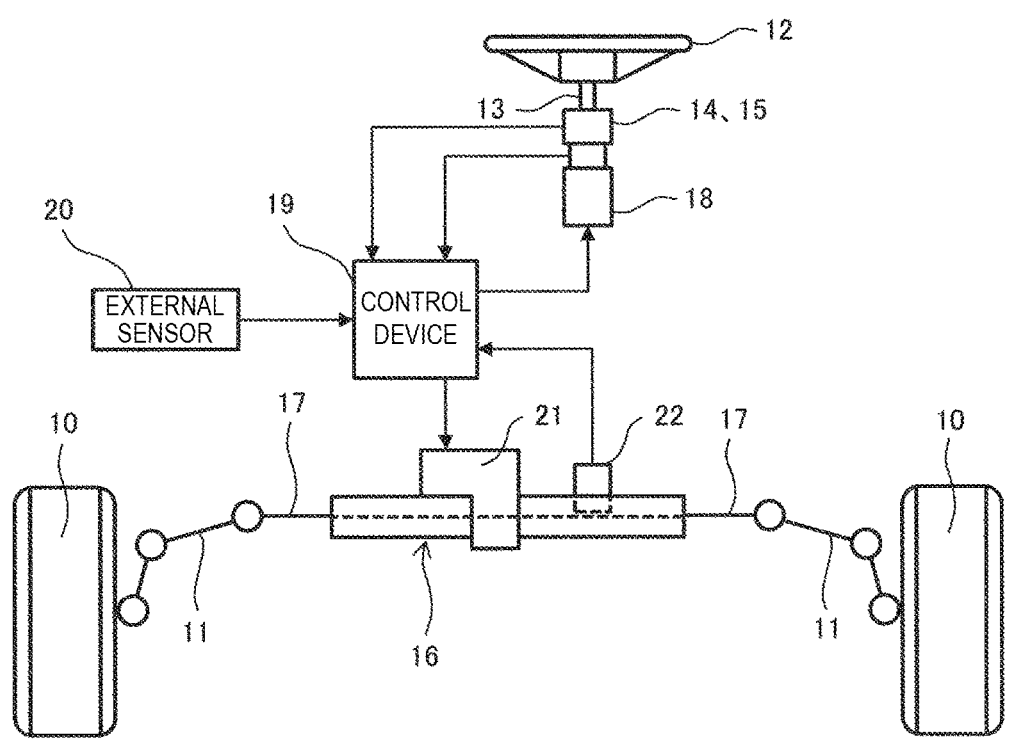
FIG. 1 is a configuration diagram illustrating the configuration of a steer-by-wire steering control apparatus to which the present invention is applied.

In FIG. 1, a steering target wheel 10 (or a wheel 10 of a vehicle to be turned) is configured to be steered by a tie rod 11, and this tie rod 11 is coupled with a steering shaft 17, which will be described below. Then, a steering wheel 12 is coupled with a steering operation shaft (corresponding to a steering operation shaft recited in the claims) 13, and a steering operation angle sensor or the like can be provided to the steering operation shaft 13 as necessary.

The steering operation shaft 13 is not linked with the steering shaft (may also be referred to as a rack bar) 17 of a steering mechanism 16, and a reaction force electric motor (corresponding to a reaction force actuator recited in the claims) 18 is provided at the distal end of the steering operation shaft 13. In other words, the steering operation shaft 13 is configured to be mechanically uncoupled with the steering mechanism 16, as a result of which the steering control apparatus is configured in such a manner that the steering operation shaft 13 and the steering mechanism 16 are disconnected. The reaction force electric motor 18 is driven by a controller 19. Hereinafter, the reaction force electric motor 18 will be referred to as the reaction force motor 18.

A reaction force motor rotational angle sensor (corresponding to a steering operation amount sensor recited in the claims) 14 is provided to the reaction force motor 18, and detects the rotational angle of the reaction force motor 18 (corresponding to a steering operation amount signal recited in the claims). The steering operation amount sensor is a sensor that detects the rotational angle of the reaction force motor 18, but may be a steering operation angle sensor that detects the steering operation angle of the steering operation shaft and the range of the steering operation amount sensor also includes sensors different therefrom that can detect the rotation of the steering operation shaft 13.

Further, a current sensor 15 is provided to the reaction force motor 18, and detects a current flowing in a coil of the reaction force motor 18. This current is used to, for example, estimate a torque operating the steering wheel 12.

A steering electric motor mechanism (corresponding to a steering actuator recited in the claims) 21 is provided to the steering mechanism 16 including the steering shaft 17, and this steering electric motor mechanism 21 controls the steering operation of the steering shaft 17. The electric motor is used as the steering actuator, but it is apparent that the steering actuator may be another type of electric actuator.

Then, the steering mechanism 16 detects the rotational angle of the steering wheel 12 by the reaction force motor rotational angle sensor 14 of the reaction force motor 18 and further detects the current flowing in the coil by the current sensor 15, and these detection signals are input to the control device (hereinafter referred to as the controller) 19. Besides them, various detection signals are input from an external sensor 20 to the controller 19.

The controller 19 calculates a control amount of the steering electric motor mechanism 21 based on the input rotational angle signal and current signal, and, further, drives the steering electric motor mechanism 21. A parameter different from the rotational angle signal and the current signal can also be used for the control amount of the steering electric motor mechanism 21.

The rotation of the steering electric motor mechanism 21 causes an output-side pulley (not illustrated) of the steering mechanism 16 to rotate from an input-side pulley (not illustrated) via a belt (not illustrated), and further causes an axial stroke operation of the steering shaft 17 via a steering nut (not illustrated), thereby causing the steering target wheel 10 to be steered. They will be described below.

Further, the controller 19 calculates a control amount of the reaction force motor 18 based on the input rotational angle signal and current signal, and, further, drives the reaction force motor 18. A parameter different from the rotational angle signal and the current signal can also be used for the control amount of the reaction force motor 18.

Now, FIG. 1 illustrates the controller 19 as one functional block, but is provided by being divided into a reaction force actuator controller and a steering actuator controller and these controllers are connected via a communication line. The reaction force actuator controller is provided to the reaction force motor 18, and the steering actuator controller is provided to the steering electric motor mechanism 21.

A rack position sensor (corresponding to a steering amount sensor recited in the claims) 22 is provided to the steering mechanism 16, and this rack position sensor 22 detects an actual steering amount (steering angle) of the steering target wheel 10 and outputs a steering amount signal. The rack position sensor 22 detects an axial movement amount of the steering shaft 17. The rack position sensor 22, which detects the stroke amount of the steering shaft 17, is described as the steering amount sensor, but the steering amount sensor may be a rotational angle sensor provided to the steering electric motor that applies a steering force to the steering shaft 17 besides that and the range of the steering amount sensor also includes sensors different therefrom that can detect the position of the steering shaft 17 (the steering amount).

The steering mechanism 16 includes the steering shaft 17, the steering electric motor, a speed reduction mechanism, and the like, but the mechanism that transmits the steering force from the steering electric motor to the steering target wheel 10 is not limited thereto.

Figure 2:
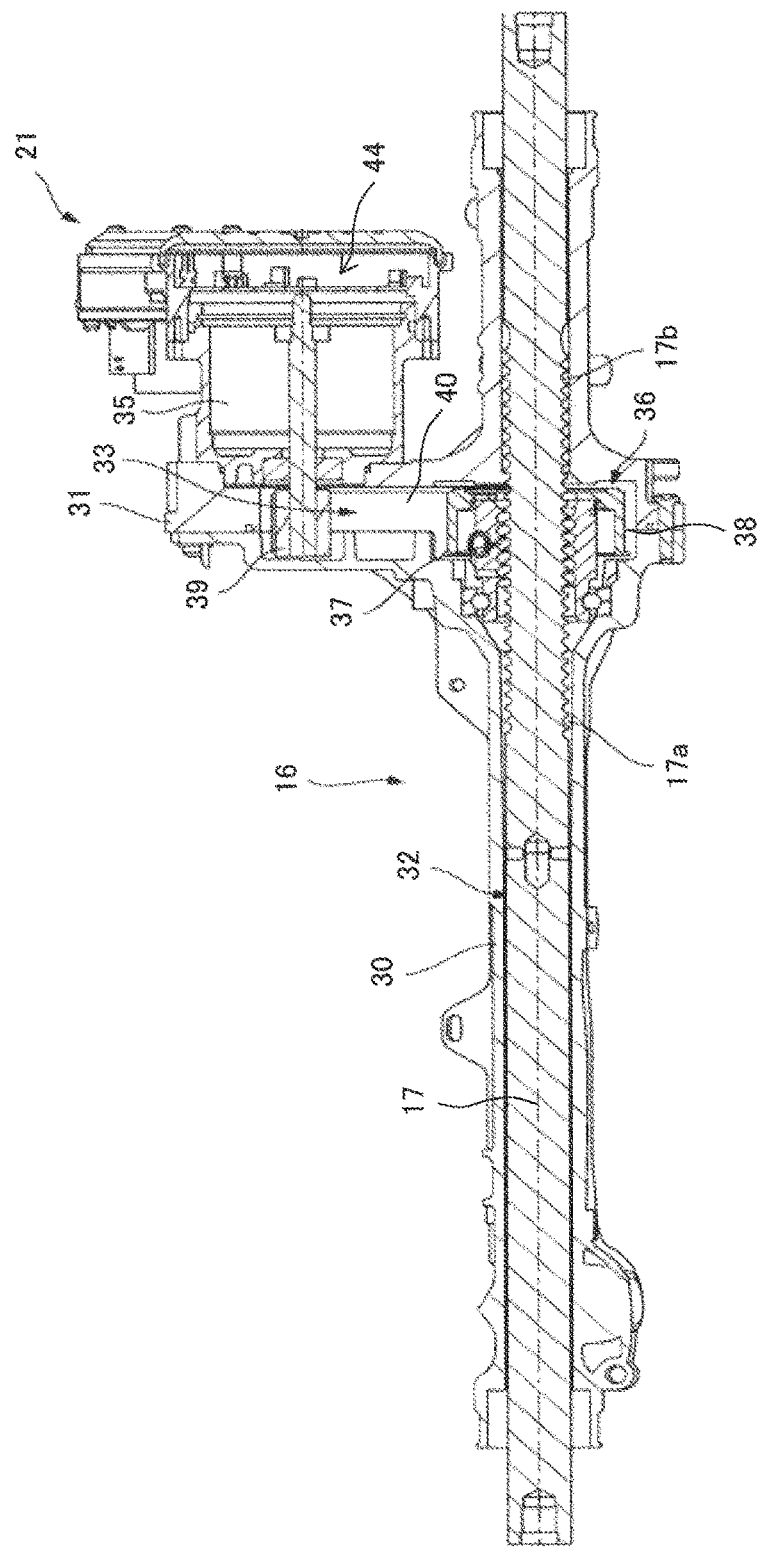
FIG. 2 is a cross-sectional view illustrating a detailed cross section of a steering mechanism illustrated in FIG. 1.

Next, the configuration of the steering mechanism 16 will be described. FIG. 2 illustrates an axial cross section of the steering mechanism 16.

Each of the constituent components of the steering mechanism 16 is contained in a housing 32. The housing 32 includes a steering shaft containing portion 30 and a speed reducer containing portion 31. The steering shaft containing portion 30 contains the steering shaft 17 axially movably. The speed reducer containing portion 31 is provided at an axially intermediate portion of the steering shaft containing portion 30, and is formed so as to surround the steering shaft 17. The speed reducer containing portion 31 contains a speed reduction mechanism 33, which will be described below.

The steering electric motor mechanism 21 includes a steering electric motor 35, a steering actuator controller 44, and a screw mechanism 36. The steering actuator controller 44 drives the steering electric motor 35. The screw mechanism 36 transmits an output of the steering electric motor 35 to the steering shaft 17. The rotational amount, the rotational speed, and the like of the steering electric motor 35 are controlled by the steering actuator controller 44 according to a steering operation amount input from a driver onto the steering wheel 12. Hereinafter, the steering electric motor 35 will be referred to as the steering motor 35.

The screw mechanism 36 includes a steering nut 37 and an output pulley 38. The output pulley 38 is shaped like a cylindrical member, and is integrally rotatably fixed to the steering nut 37. A cylindrical input pulley 39 is integrally rotatably fixed to a driving shaft of the steering motor 35. A belt 40 is wound between the output pulley 38 and the input pulley 39. The speed reduction mechanism 33 is formed by the input pulley 39, the output pulley 38, and the belt 40.

The steering nut 37 is formed annularly so as to surround the steering shaft 17, and is provided rotatably relative to the steering shaft 17. A groove is helically formed on the inner periphery of the steering nut 37, and this groove forms a nut-side ball screw groove. Helical grooves are also formed on the outer periphery of the steering shaft 17, and these grooves form steering shaft-side ball screw grooves 17a and 17b.

A ball circulation groove is formed by the nut-side ball screw groove and the steering shaft-side ball screw grooves 17a and 17b with the steering shaft 17 inserted in the steering nut 37. A plurality of balls is loaded in the ball circulation groove. When the nut 37 rotates, the balls move in the ball circulation groove, by which the steering shaft 17 performs a stroke operation and moves longitudinally relative to the steering nut 37.

The vehicle can be steered by controlling the rotational amount, the rotational direction, the rotational speed, and the like of the steering motor 35 using the steering actuator controller 44 to cause the steering shaft 17 to operate according to the steering operation on the steering wheel 12 in this manner.

The steering mechanism 16 illustrated in FIG. 2 is indicated as being configured to be mounted only on the front wheels of the vehicle, but can also be mounted on the rear wheel side of the vehicle. Therefore, not only the front wheels of the vehicle but also the rear wheels can be steered by the steering motor 35.

Figure 3:
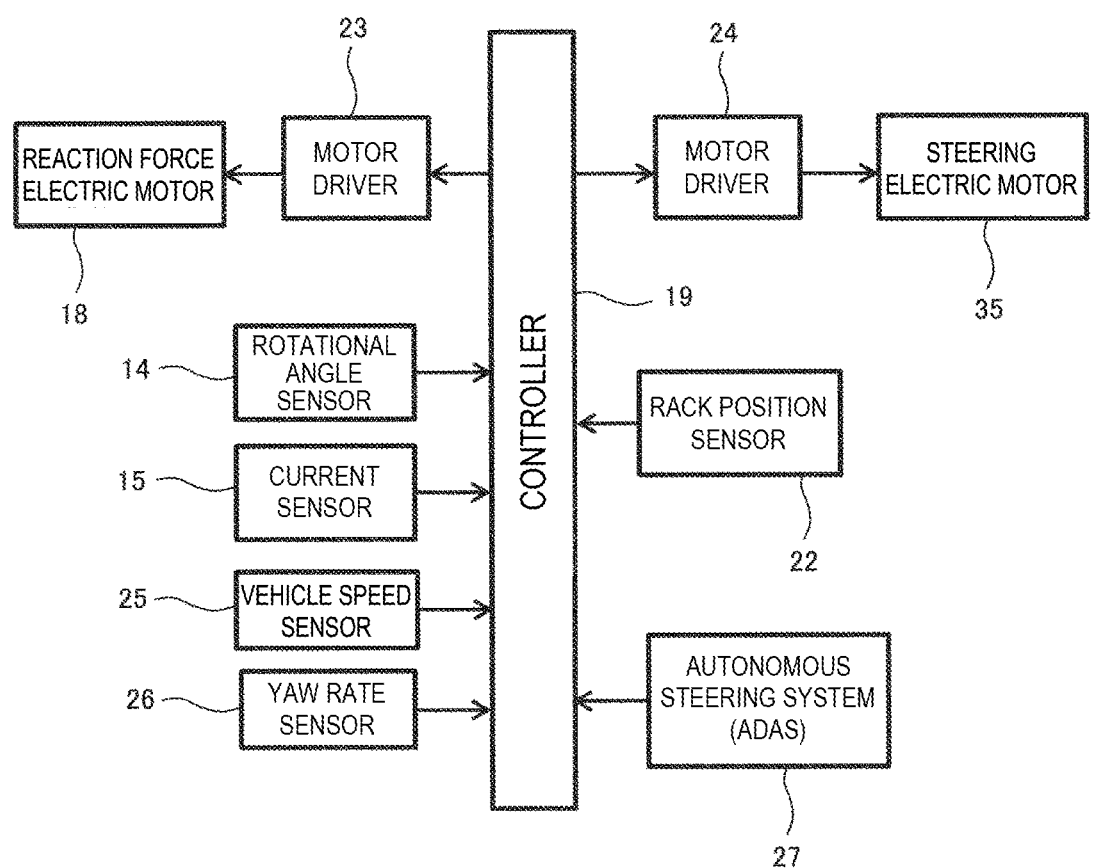
FIG. 3 is a configuration diagram schematically illustrating a control device illustrated in FIG. 1.

Next, FIG. 3 illustrates the schematic configuration of a control circuit of the reaction force motor 18 and the steering motor 35. This controller 19 indicates both the reaction force actuator controller and the steering actuator controller.

The reaction force motor 18 connected to the steering operation shaft 13 is provided with the reaction force motor rotational angle sensor 14 and the current sensor 15, and the reaction force motor 18 is mechanically connected to the steering wheel 12 via the steering operation shaft 13. The reaction force motor rotational angle sensor 14 is a sensor that detects the rotational angle of the reaction force motor 18, and the current sensor 15 is a sensor that detects the current flowing in the coil of the reaction force motor 18.

The reaction force motor 18 is an electric motor that applies a steering reaction force to the steering operation shaft 13 via a motor driver 23 controlled by the controller 19, and monitors an input of the reaction force motor rotational angle sensor 14 and applies a determined steering reaction force to the steering operation shaft 13.

Further, the controller 19 feeds a driving signal according to signals detected by the reaction force motor rotational angle sensor 14, the current sensor 15, and the like to the steering motor 35 mechanically connected to the steering shaft 17 via a motor driver 24.

The controller 19 receives a rotational angle signal fed from the reaction force motor rotational angle sensor 14, receives a current signal fed from the current sensor 15, and further receives running state detection signals of the vehicle that affect steering from running state sensors such as a vehicle speed sensor 25, a yaw rate sensor 26, and the like. Further, the controller 19 receives a detection signal indicating a movement position of the steering shaft 17 (corresponding to the steering amount) fed from the rack position sensor 22 (refer to FIG. 2) mounted at an intermediate portion of the housing 32 covering the steering shaft 17.

Now, the rack position sensor 22 is a sensor that detects the position of the steering shaft 17, but the value detected by the rack position sensor 22 allows the steering angle of the steering target wheel 10 to be detected because the steering shaft 17 is directly connected to the tie rod 11. In this manner, the rack position sensor 22 functions as a steering angle detector of the steering target wheel 10.

In the following description, the rack position means the stroke amount of the steering shaft 17 or the steering amount, and also means the steering angle of the steering target wheel 10. Therefore, although these terms will be used as appropriate, what is referred to by them will be the same.

Further, the controller 19 receives an external steering instruction value fed from an autonomous steering system (an ADAS system) 27. The external steering instruction value is an instruction value calculated by the autonomous steering system 27, and is issued to steer the steering target wheel 10 by the steering mechanism 16 when the vehicle departs from inside a white line on a road or avoids an obstacle with the aid of lane keeping control. The present embodiment that will be described below is an embodiment in which the autonomous steering system performs the lane keeping control.

The controller 19 introduces, for example, the detection signals indicating the rotational angle, the current, the rack position, the running state amounts, and the external steering instruction value fed from the reaction force motor rotational angle sensor 14, the current sensor 15, the rack position sensor 22, the running state sensors 25 and 26, and the autonomous steering system 27, respectively, per predetermined sampling cycle, determines a steering amount that should be provided to the steering shaft 17 by combining the introduced detection signals and external steering instruction value as appropriate, calculates a coil current that should be supplied to the steering motor 35 to acquire this steering amount, and feeds a control signal according to a result of this calculation to the motor driver 24.

Similarly, the controller 19 determines a steering reaction force that should be applied to the steering wheel 12 by combining, for example, the detection signals indicating the rotational angle, the current, the rack position, the running state amounts, and the external steering instruction value, calculates a coil current that should be supplied to the reaction force motor 18 to acquire this steering reaction force, and feeds a control signal according to a result of this calculation to the motor driver 23.

Now, a steering ratio variable system is mounted on the controller 19. The steering ratio variable system corresponds to one embodiment of steering angle control using the running state information of the vehicle, and functions to adjust a steering ratio, which is the ratio between the steering angle of the steering target wheel 10 and the rotational angle of the steering wheel 12, according to the vehicle speed. As described above, the "steering ratio" is defined to refer to the ratio of an amount corresponding to a change in the steering angle of the steering target wheel 10 to an amount corresponding to a change in the rotational angle of the steering wheel 12, and the steering ratio is expressed as the "steering ratio=the rotational angle of the steering motor/the rotational angle of the reaction force motor".

Figure 4:
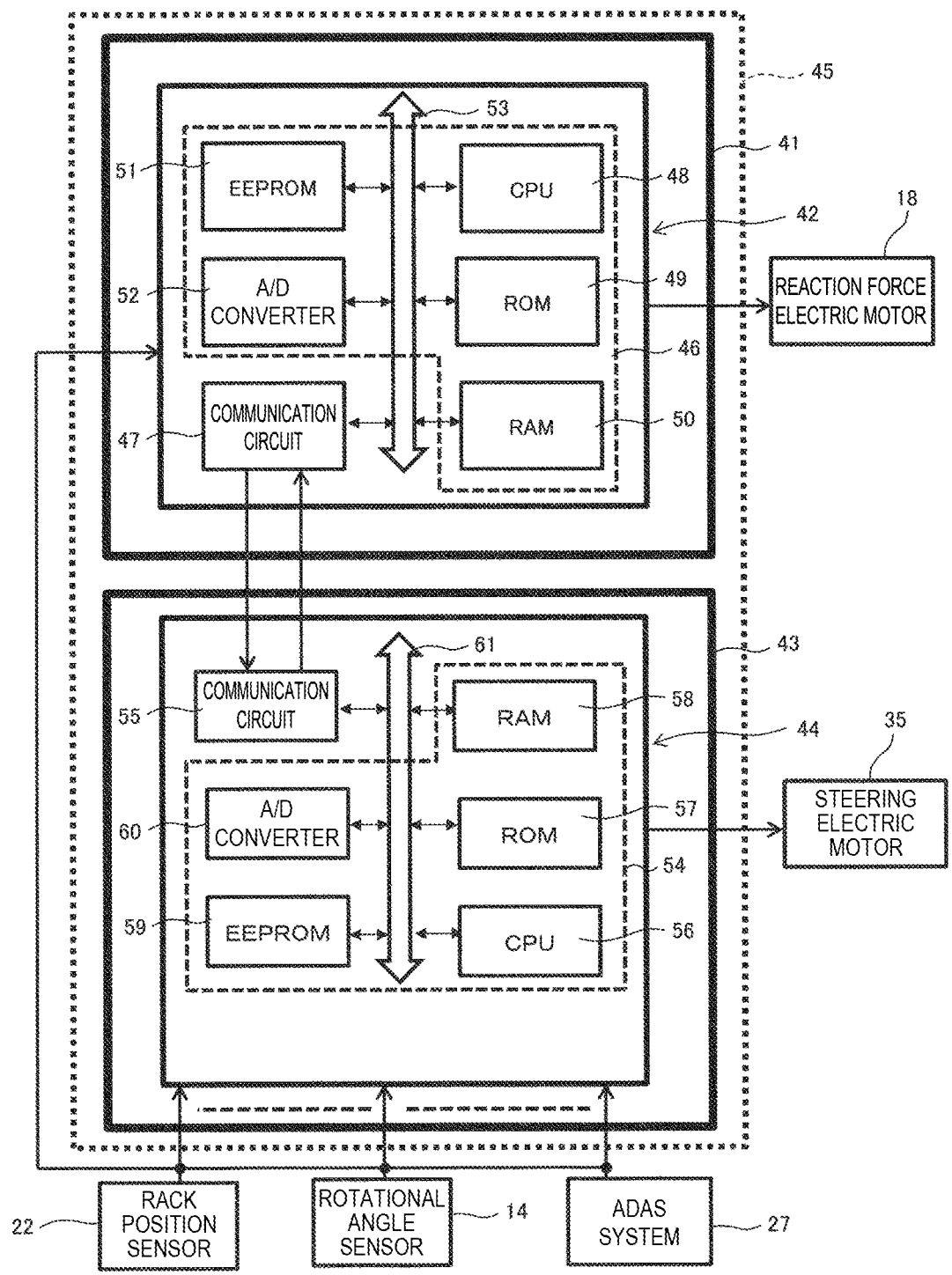
FIG. 4 is a configuration diagram illustrating the detailed configuration of the control device illustrated in FIG. 3.

Next, FIG. 4 illustrates the hardware configuration of the controller 19. In the present embodiment, the reaction force actuator controller 42 is built in the reaction force motor 18, and the steering actuator controller 44 is built in the steering motor 35. However, the reaction force actuator controller 42 and the steering actuator control 44 can also be built in a common housing 45 indicated by a broken line and provided in another component member.

The reaction force actuator controller 42 includes a reaction force actuator microprocessor 46 as a main component thereof, and further includes a communication circuit 47. The reaction force actuator microprocessor 46 includes a CPU 48, which is an arithmetic device, a ROM 49, a RAM 50, and an EEPROM (flash ROM) 51, which are memories, an A/D converter 52, a bus line 53, and the like.

The CPU 48 controls the reaction force motor 18 by executing various kinds of programs stored in the ROM 49. Therefore, an operation executed by the program can be deemed as a control function.

The ROM 49 stores therein the various kinds of programs that the CPU 48 executes. More specifically, the ROM 49 stores therein a control program for performing motor control processing for controlling the reaction force motor 18 (reaction force control processing). Further, this ROM 49 stores a diagnosis program that diagnoses the reaction force motor 18 therein. The control program and the diagnosis program are used to exert a predetermined control function and diagnosis function by the CPU 48.

When the CPU 48 executes the control program, the RAM 50 is used as a work area therefor, and temporarily stores therein data required in the course of the processing and a processing result. Similarly, after the diagnosis program is executed, the RAM 50 temporarily stores therein a diagnosis result as an error code.

The EEPROM 51 is a memory capable of retaining the storage content even after being powered off, and stores therein a correction value specific to the hardware and the error code after the diagnosis function is exerted. Further, the A/D converter 52 has a function of converting an analog detection signal fed from an external sensor into a digital signal.

Next, the steering actuator controller 44 includes a steering actuator microprocessor 54 as a main component thereof, and further includes a communication circuit 55.

The steering actuator microprocessor 54 includes a CPU 56, which is an arithmetic device, a ROM 57, a RAM 58, and an EEPROM (flash ROM) 59, which are memories, an A/D converter 60, a bus line 61, and the like.

The CPU 56 controls the steering motor 35 by executing various kinds of programs stored in the ROM 57. Therefore, an operation executed by the program can be deemed as a control function.

The ROM 57 stores therein various kinds of programs that the CPU 56 executes. More specifically, the ROM 57 stores therein a control program for performing motor control processing for controlling the steering motor 35 (steering control processing). Further, this ROM 57 stores a diagnosis program that diagnoses the steering motor 35 therein. The control program and the diagnosis program are used to exert a predetermined control function and diagnosis function by the CPU 56.

When the CPU 56 executes the control program, the RAM 58 is used as a work area therefor, and temporarily stores therein data required in the course of the processing and a processing result. Similarly, after the diagnosis program is executed, the RAM 58 temporarily stores therein a diagnosis result as an error code.

The EEPROM 59 is a memory capable of retaining the storage content even after being powered off, and stores therein a correction value specific to the hardware and the error code after the diagnosis function is exerted. Further, the A/D converter 60 has a function of converting an analog detection signal fed from an external sensor into a digital signal.

Further, the reaction force actuator microprocessor 46 and the steering actuator microprocessor 54 introduce therein, for example, the detection signals indicating the rotational angle, the current, the rack position, the running state amounts, and the external steering instruction value fed from the reaction force motor rotational angle sensor 14, the current sensor 15, the rack position sensor 22, the running state sensors 25 and 26, and the autonomous steering system 27, respectively, per predetermined sampling cycle.

Further, control data and the like calculated by the reaction force actuator microprocessor 46 and the steering actuator microprocessor 54 are mutually exchanged via the communication circuit 47 and the communication circuit 55.

Next, the controller 19 configured in this manner will be described focusing on the configuration of control blocks therein according to the present embodiment that control the reaction force motor 18 and the steering motor 35, and a control flow corresponding to these control blocks.

Figure 5:
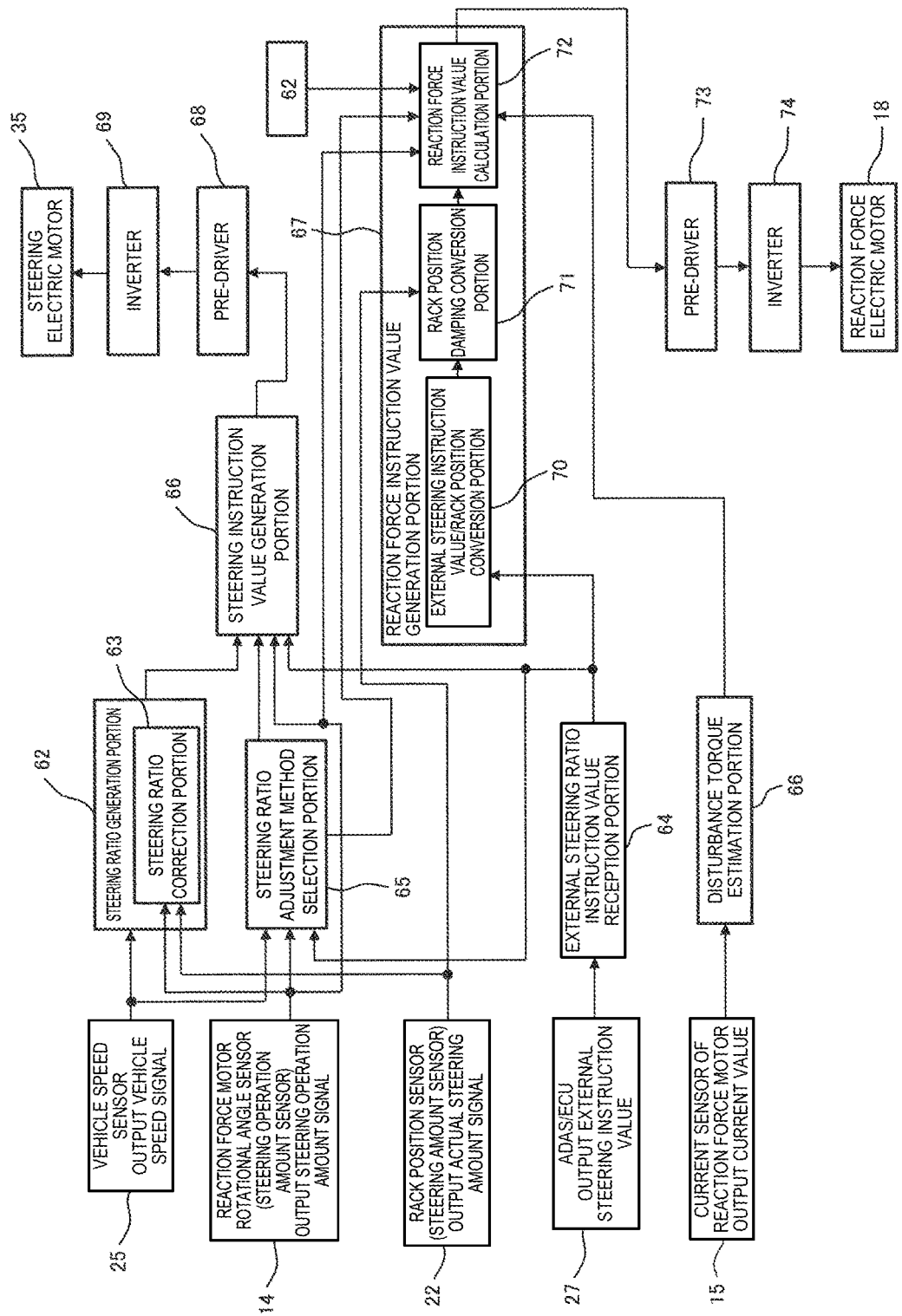
FIG. 5 is a functional block diagram illustrating a basic first embodiment of the present invention.
Figure 6:
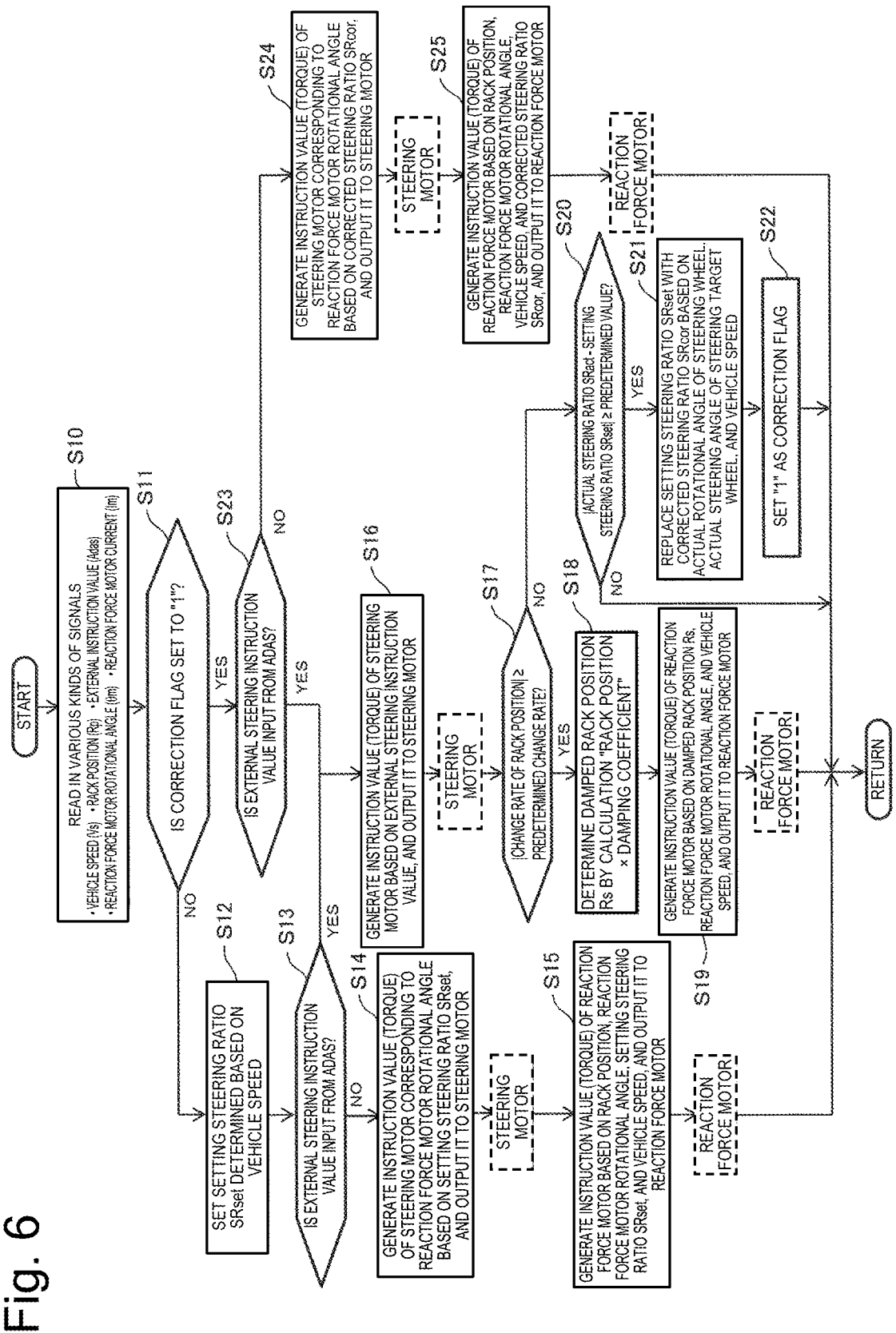
FIG. 6 is a basic control flowchart in which the functional blocks illustrated in FIG. 5 are developed into a control flow.

Now, control blocks illustrated in FIG. 5 and a control flow illustrated in FIG. 6 are examples assuming that the reaction force actuator controller 42 and the steering actuator controller 44 are one controller.

In FIG. 5, inputs fed thereto include at least the detection signal from the vehicle speed sensor 25, which outputs the vehicle speed signal, the detection signal from the reaction force motor rotational angle sensor 14, which outputs the rotational angle signal of the reaction force motor 18 (the steering operation amount), the detection signal from the reaction force motor current sensor 15, which outputs the coil current of the reaction force motor 18, the detection signal from the rack position sensor 22, which outputs the rack position signal (the steering amount), and the external steering instruction value from the autonomous steering system 27.

In the present example, the external steering instruction value from the autonomous steering system 27 is a steering instruction value in the lane keeping control, and is output when the vehicle departs from inside a white line on a road or when the vehicle avoids an obstacle.

The vehicle speed signal is input to a steering ratio generation portion 62, and the steering ratio generation portion 62 sets a setting steering ratio (SRset) corresponding to the vehicle speed. This setting steering ratio (SRset) is stored in a steering ratio setting map in association with the vehicle speed serving as a parameter, and is read out in correspondence with the vehicle speed. Further, the steering ratio generation portion 62 includes a steering ratio correction portion 63.

This steering ratio correction portion 63 has a function of determining an actual steering ratio (SRact) by receiving inputs of the reaction force motor rotational angle and the rack position, and correcting the setting steering ratio (SRset) and determining a corrected steering ratio (SRcor) if a "mismatch (or deviation)" occurs between the actual steering ratio (SRact) and the setting steering ratio (SRset). Due to this corrected steering ratio (SRset), the setting steering ratio (SRset) is corrected closer to the actual steering ratio (SRact), by which the "mismatch" can be reduced.

Further, the vehicle speed signal, the reaction force motor rotational angle signal, and the external steering instruction value input to an external steering instruction value reception portion 64 are input to a steering ratio adjustment method selection portion 65. Then, the steering ratio adjustment method selection portion 65 has a function of selecting a method for correcting the steering ratio based on this or these one or more pieces of input information.

The steering ratio can be adjusted by changing the rotational angle of the reaction force motor 18 or the rotational angle of the steering motor 35 as described above, and therefore the steering ratio adjustment method selection portion 65 selects which to select, the rotational angle of the reaction force motor 18 or the rotational angle of the steering motor 35 according to the running state. A selection signal is transmitted to a steering instruction value generation portion 66 or a reaction force instruction value generation portion 67, which will be described below.

Further, the external steering instruction value from the external steering instruction value reception portion 64 is also input to a steering instruction value generation portion 66. In addition to the external steering instruction value, the setting steering ratio (SRset) or the corrected steering ratio (SRcor) from the setting steering ratio generation portion 62, and the reaction force motor rotational angle signal are input to the steering instruction value generation portion 66, and the steering instruction value generation portion 66 determines a steering torque instruction value to feed to the steering motor 35.

A basic steering torque instruction value is determined based on the reaction force motor rotational angle, and a final steering torque instruction value is determined by reflecting the external steering instruction value and the steering ratio (SRset or SRcor) in this basic steering torque instruction value. For example, when the external steering instruction value is input from the autonomous steering system 27 to avoid a collision, the external steering instruction value or a steering torque instruction value resulting from adding the basic steering torque instruction value and the external steering instruction value is determined as the final steering torque instruction value.

The final steering torque instruction value is transmitted to a pre-driver 68, and the pre-driver 68 controls a MOSEFT of an inverter 69 or the like to drive the steering motor 35, thereby causing the steering shaft 17 to perform the stroke operation to steer the steering target wheel 10 as a result thereof.

On the other hand, the external steering instruction value is input to an external steering instruction value/rack position conversion portion 70 of the reaction force instruction value generation portion 67, and this external steering instruction value/rack position conversion portion 70 determines a rack position (a rack stroke position) corresponding to the external steering instruction value. Then, a rack position damping conversion portion 71 at a subsequent stage thereto converts the rack position (the rack stroke position) into a required smaller damped rack position because the rotational angle of the reaction force motor 18 would increase if this rack position corresponding to the external steering instruction value is directly used.

An actually acquired actual rack position (an actual rack stroke amount=an actual steering amount) from the rack position sensor 22 and the external steering rack position (an external rack stroke amount=an external steering amount) corresponding to the external steering instruction value are input to the rack position damping conversion portion 71. Then, a damped rack position (a damped steering amount) into which the actual rack position is damped is determined by subtracting the external steering rack position from the actual rack position.

Alternatively, the damped rack position (the damped steering amount) into which the actual rack position is damped is determined by multiplying the actual rack position (the actual rack stroke amount=the actual steering amount) by a predetermined damping coefficient (a damping gain). In the present embodiment, the method that damps the actual rack position by multiplying it by the damping coefficient is employed as indicated in the control flow that will be described below.

The damped rack position is input to the reaction force instruction value calculation portion 72, but the reaction force motor rotational angle is also input to the reaction force instruction value calculation portion 72, and the steering reaction force of the reaction force motor 18 is determined based on these inputs. The reaction force rotational angle is converted into the basic reaction force torque instruction value based on a map search, and the damped rack position is converted into a correction reaction force torque instruction value based on a map search. Then, a reaction force instruction resulting from adding them is determined as the final reaction force torque instruction value.

The final reaction force torque instruction value is transmitted to a pre-driver 73, and the pre-driver 73 controls a MOSEFT of an inverter 74 or the like to drive the reaction force motor 18, and the steering reaction force is applied to the steering wheel 12 as a result thereof.

In this manner, the reaction force instruction value generation portion 67 generates the reaction force instruction value from the actual steering amount determined based on the actual rack position, based on the damped steering amount resulting from subtracting a part or a whole of the amount corresponding to the change in the external steering amount determined based on the external steering instruction value or the damped steering amount resulting from multiplying the actual steering amount determined based on the actual rack position by the damping coefficient.

Therefore, for example, when the steering target wheel is rapidly steered for an emergent avoidance motion of the vehicle, the steering control apparatus does not reflect the steering angle of the steering target wheel based on the external steering instruction value in the control of the reaction force motor 18 or reflects it after damping it without controlling the reaction force motor 18 according to this motion of the steering target wheel, thereby preventing a rapid rotation of the steering wheel 12 and thus succeeding in reducing the uncomfortable feeling felt by the driver toward the steering.

On the other hand, after the steering target wheel is rapidly steered for the above-described emergent avoidance motion of the vehicle, a difference is generated between the steering angle of the steering target wheel 10 and the rotational angle of the steering wheel 12. Therefore, when the steering wheel 12 is rotated toward the neutral position, the relationship between the rotational angle of the steering wheel 12 and the steering target wheel 10 does not match the steering ratio if the steering ratio remains uncorrected from the setting steering ratio (SRset), and the driver has such an uncomfortable feeling that the vehicle does not run straight even with the steering wheel 12 located at the neutral position.

Therefore, the steering control apparatus is configured to input the corrected steering ratio (SRcor) fed from the steering ratio setting portion 62, thereby allowing the relationship between the rotational angle of the steering wheel 12 and the steering target wheel 10 to match it. This will be described with reference to the control flow in FIG. 6.

In this manner, the actual steering ratio, which is the linkage relationship between the steering target wheel 10 and the steering wheel 12, is controlled based on the setting steering ratio. However, the emergent avoidance operation may cause the "mismatch" between the actual steering ratio and the setting steering ratio, but, in the present embodiment, the steering control apparatus corrects this "mismatch" by the steering ratio correction portion 63, thereby improving the consistency of the linkage relationship between the driver's steering operation on the steering wheel 12 and the steering angle of the steering target wheel 10, allowing the relationship between the rotational angle of the steering wheel 12 and the steering target wheel 10 to match the steering ratio, and thus reducing the uncomfortable feeling evoked in the driver.

Next, the control flow corresponding to the above-described control blocks will be described with reference to FIG. 6. This control flow is intended to facilitate a better understanding of the technical idea of the present embodiment, and actual control calculations and the like therein will be only briefly described herein because various methods are available therefor. Further, this control flow is performed at a temporal periodic startup timing, and is, for example, started up according to time-based interruption of 10 ms.

<<Step S10>> In step S10, the controller 19 detects operation parameters indicating the operation state of the steering control apparatus using various kinds of sensors. In the present embodiment, the controller 19 detects at least the vehicle speed (Vs), the rack position (Rp), the reaction force motor rotational angle (Om), the reaction force motor current (Im), and the external steering instruction value (Adas). It is apparent that an operation parameter different from them can also be detected if necessary. After the required operation parameters are detected, the control flow proceeds to step S11.

<<step S11>> In step S11, the controller 19 determines whether "1" is set as a correction flag, which will be described below. If "1" is set as the correction flag, the corrected steering ratio (SRcor), which is the characteristic of the present embodiment, is determined to be set at this point. This corrected steering ratio (SRcor) is a steering ratio set when the external steering instruction value (Adas) is input and the steering target wheel 10 is largely steered. A reason for setting it will be described below. If the corrected steering ratio (SRcor) is not set, the control flow proceeds to step S12. If the corrected steering ratio (SRcor) is set, the control flow proceeds to step S23. <<Step S12>> In step S12, the controller 19 sets the setting steering ratio (SRset) corresponding to the vehicle speed because the external steering instruction value (Adas) is not input at this point. The setting steering ratio (SRset) is read out from a steering ratio table (a kind of search map) storing a desired steering ratio for the vehicle speed (Vs) therein.

The steering ratio table stores therein, for example, such a steering ratio that the steering angle of the steering target wheel 10 has a large value with respect to the rotational angle of the steering wheel 12 (a quick ratio) when the vehicle speed is a low or intermediate speed and the steering angle of the steering target wheel 10 has a small value with respect to the rotational angle of the steering wheel 12 (a slow ratio) when the vehicle speed is a high speed. After the setting steering ratio (SRset) is set, the control flow proceeds to step S13.

<<Step S13>> In step S13, the controller 19 determines whether the external steering instruction value (Adas) is input from the autonomous steering system 27. This external steering instruction value (Adas) functions to conduct the emergent avoidance operation for avoiding a collision by largely steering the steering target wheel 10 independently of the steering wheel 12 operated by the driver when an obstacle is detected by the autonomous steering control of the autonomous steering system 27 using the in-vehicle camera, the in-vehicle radar, or the like. It is apparent that this external steering instruction value (Adas) is not only a steering instruction value for avoiding a collision but also may be another steering instruction value.

If the external steering instruction value (Adas) is not input, the control flow proceeds to step S14. If the external steering instruction value (Adas) is input, the control flow proceeds to step S16.

<<Step S14>> In step S14, the controller 19 determines the steering angle of the steering motor 35 in such a manner that this steering angle corresponds to the set setting steering ratio (SRset). For example, the controller 19 calculates the steering angle of the steering motor 35 in such a manner that this steering angle satisfies the set steering ratio (SRset) with respect to the rotational angle of the reaction force motor 18 synchronized with the rotation of the steering wheel 12. This calculation may be made by an arithmetical calculation or can also be made by a map search calculation. Then, the controller 19 generates the steering torque instruction value of the steering motor 35 based on the steering angle, thereby driving the steering motor 35.

Then, at the same time that the processing in step S14 is performed or after the processing in step S14 is performed, step S15 is performed.

<<Step S15>> In step S15, the controller 19 generates the reaction force instruction value, thereby driving the reaction force motor 18. The reaction force instruction value is determined by making a predetermined calculation using the reaction force motor rotational angle (Om), the rack position (Rp), the vehicle speed (Vs), the setting steering ratio (SRset), and the like.

Now, the reaction force motor rotational angle (Om) indicates the basic reaction force, and the reaction force motor rotational angle (Om) and the basic reaction force are stored in a table (a kind of search map) and the basic reaction force corresponding to the reaction force motor rotational angle (Om) is read out. Further, the rack position (Rp/the steering amount) indicates a correction reaction force from the road surface, and the rack position (Rp) and the correction reaction force are stored in a table (a kind of search map) and the correction reaction force corresponding to the rack position (Rp) is read out. Further, a plurality of tables is prepared in correspondence with the vehicle speed (Vs) for each of these tables, and the steering control apparatus is configured in such a manner that the table selected according to the vehicle speed (Vs) is used.

Then, the controller 19 generates the final reaction force torque instruction value with the setting steering ratio (SRset) reflected in the reaction force resulting from adding the basic reaction force and the correction reaction force, thereby driving the reaction force motor 18. After the end of step S15, the control flow proceeds to RETURN, and the controller 19 is supposed to wait for the next startup timing.

The above-described steps, step S11 to step S15 are a flow during normal driving operation performed by the driver. Next, a control flow when the autonomous steering system 27 is in operation will be described.

<<Step S16>> On the other hand, if the external steering instruction value (Adas) is determined to be input in step S13, step S16 is performed. In step S16, the controller 19 performs the emergent avoidance operation because the external steering instruction value (Adas) is input. This emergent avoidance operation is performed independently of the steering operation on the steering wheel 12, and the steering torque instruction value of the steering motor 35 is determined based on the steering amount corresponding to the external steering instruction value (Adas) in this case.

It is apparent that the final steering torque instruction value of the steering motor 35 may be set by adding the steering torque instruction value of the steering motor 35 corresponding to the rotational angle of the steering wheel 12 (the rotational angle of the reaction force motor) to the steering torque instruction value of the steering motor 35 corresponding to the external steering instruction value (Adas).

Now, the steering ratio is not reflected in the calculation in step S16, but priority is anyway placed on the execution of the steering control on the steering target wheel 10 when the emergent avoidance operation is performed according to the external steering instruction value (Adas), and therefore a quick calculation is carried out without using the steering ratio in step S16. However, the steering ratio may also be taken into consideration when the situation allows the calculation to take time or when necessary. After the steering motor 35 is driven and the emergent avoidance operation is performed, the control flow proceeds to step S17.

<<Step S17>> In step S17, with the steering target wheel 10 steered due to the driving of the steering motor 35, the steering amount of this steering target wheel 10 is detected by the rack position sensor 22. Then, the controller 19 determines whether a change rate of the rack position (Rp) of the steering shaft 17 is higher than a predetermined change value.

A change rate higher than the predetermined change rate means that the steering target wheel 10 is largely steered, and a change rate lower than the predetermined change rate means that the steering of the steering target wheel 10 is slowed down or is stopped. If the change rate is higher than the predetermined change rate, the control flow proceeds to step S18. If the change rate is lower than the predetermined change rate, the control flow proceeds to step S20.

<<Step S18>> In step S18, the controller 19 determines the damped rack position (Rs) as if the change in the rack position (Rp) is small by multiplying the detected rack position (Rp) by the predetermined damping coefficient (the damping gain). This adjustment is made to, when the steering target wheel 10 is largely steered, purposefully reduce the change in the rack position (Rp) to prevent the steering wheel 12 from being largely rotated according thereto.

The damped rack position (Rs) is determined by multiplying the rack position (Rp) by the damping coefficient in this example, but, besides this method, may be determined by subtracting the rack position (equivalent to the steering amount) corresponding to the external steering instruction value (Adas) from the actual rack position (Rp) or may be determined by subtracting a predetermined fixed rack position. After the damped rack position (Rs) is determined, the control flow proceeds to step S19.

<<Step S19>> In step S19, the controller 19 makes a predetermined calculation using the reaction force motor rotational angle (Om), the damped rack position (Rs), the vehicle speed (Vs), and the like, thereby determining the reaction force torque instruction value of the reaction force motor 18.

The reaction force motor rotational angle (Om) indicates the basic reaction force, and the reaction force motor rotational angle (Om) and the basic reaction force are stored in a table (a kind of search map) and the basic reaction force corresponding to the reaction force motor rotational angle (Om) is read out.

Further, the damped rack position (Rs) indicates the correction reaction force from the road surface, and the rack position (Rp) and the correction reaction force are stored in a table (a kind of search map) and the correction reaction force corresponding to the rack position (Rp) is read out. Further, a plurality of tables is prepared in correspondence with the vehicle speed (Vs) for each of these tables, and the steering control apparatus is configured in such a manner that the table selected according to the vehicle speed (Vs) is used.

The steering ratio is also unreflected in the calculation in step S19 at this time, but a quick calculation is carried out without use of the steering ratio in conformity with step S16. Further, the steering ratio is kept from being reflected because the relationship between the rotational angle of the steering wheel 12 and the steering angle of the steering target wheel 10 is broken due to the processing in step S17.

Then, the controller 19 generates the final reaction force torque instruction value resulting from adding the basic reaction force and the correction reaction force, thereby driving the reaction force motor 18. After the end of step S19, the control flow proceeds to RETURN, and the controller 19 is supposed to wait for the next startup timing.

According to these steps, step S16 to step S19, a rapid rotation of the steering wheel 12 can be prevented by, when the steering target wheel 10 is rapidly steered due to the emergent avoidance operation of the vehicle, keeping the change in the steering target wheel 10 based on the external steering instruction value (Adas) from being reflected in the control on the reaction force motor 18 without controlling the reaction force motor 18 according to this motion of the steering target wheel 10.

Next, a control flow after the steering target wheel 10 is steered due to the operation based on the external steering instruction value (Adas) fed from the autonomous steering system 27 and steps S18 and S19 are performed will be described.

<<Step S20>> If the change rate of the rack position (Rp) is determined to be lower than the predetermined change rate and the steering of the steering target wheel 10 is determined to be slowed down or stopped in step S17, step S20 is performed. The rotational angle of the reaction force motor 18 and the rotational angle of the steering motor 35 at this time are highly likely different from the setting steering rate (SRset) due to the processing in step S19.

Therefore, in step S20, the controller 19 determines whether a difference between the actual steering ratio (SRact), which is determined from the rotational angle of the steering motor 35 determined based on the rack position (Rp) at this point and the rotational angle of the reaction force motor 18, and the setting steering ratio (SRset) is greater than a predetermined value, thereby determining whether the "mismatch" occurs therebetween.

Then, if the difference between the actual steering ratio (SRact) and the setting steering ratio (SRset) is determined to be smaller than the predetermined value, the control flow proceeds to RETURN, and the controller 19 is supposed to wait for the next startup timing. On the other hand, if the difference between the actual steering ratio (SRact) and the setting steering ratio (SRset) is greater than the predetermined value, the "mismatch" is determined to occur, and the control flow proceeds to step S21.

<<Step S21>> In step S21, the controller 19 sets the corrected steering ratio (SRcor) based on the actual rotational angle of the reaction force motor 18 (=the rotational angle of the steering wheel), the actual rotational angle of the steering motor (the steering angle of the steering target wheel), and the vehicle speed (V). This corrected steering ratio (SRcor) may be the actual steering ratio (SRact) at this point or may be the setting steering ratio (SRset) close to this actual steering ratio (SRact). In the present embodiment, the corrected steering ratio (SRcor) is set to the setting steering ratio (SRset) close to the actual steering ratio (SRact). The detected vehicle speed (Vs) is used to search for the corrected steering ratio (SRcor) from the table.

Once again, this corrected steering ratio (SRcor) is intended to resolve the "mismatch" between the rotational position of the steering wheel 12 and the steering angle of the steering target wheel 10 at least when the steering wheel 12 is returned to the neutral position. After the corrected steering ratio (SRcor) is determined, the control flow proceeds to step S22.

<<Step S22>> The correction flag is used to reflect the corrected steering ratio (SRcor) in the operations of the steering motor 35 and the reaction force motor 18 when a steering operation is performed on the steering wheel 12 to return the steering wheel 12 to the neutral position in step S11. Therefore, in step S22, "1" is set as the correction flag when the corrected steering ratio (SRcor) is set. After the correction flag is set, the control flow proceeds to RETURN, and the controller 19 is supposed to wait for the next startup timing.

Next, a control flow when the driver operates the steering wheel 12 to return the steering wheel 12 to the neutral position after the steering target wheel 10 is steered according to the external steering instruction value (Adas) will be described.

<<Step S23>> In the above-described step, step S11, the steering ratio is determined to be changed to the corrected steering ratio (SRcor) after the steering target wheel 10 is largely steered according to the external steering instruction value (Adas) because "1" is set as the correction flag in step S22.

Then, in step S23, the controller 19 determines whether the external steering instruction value (Adas) is input from the autonomous steering system 27 again. If the external steering instruction value (Adas) is input, the controller 19 performs the control processing in step S16 and the steps subsequent thereto again. On the other hand, if the external steering instruction value (Adas) is determined not to be input, the control flow proceeds to step S24.

<<Step S24>> Because the steering wheel 12 is in the course of being returned to the neutral position at the present moment, the inconsistency between the steering angle of the steering target wheel 10 according to the external steering instruction value (Adas) and the rotational angle of the steering wheel 12 set in steps S18 and S19 should be corrected. Failing to correct it leads to such a phenomenon that the steering target wheel 10 cannot be fully returned to the neutral position when the steering wheel 12 is returned to the neutral position.

Therefore, in step S24, the controller 19 determines the rotational angle of the steering motor 35 (the steering amount) based on the corrected steering ratio (SRcor). The controller 19 calculates the rotational angle of the steering motor 35 (the steering amount) in such a manner that this rotational angle satisfies the corrected steering ratio (SRcor) with respect to the reaction force motor rotational angle ($\theta$m) of the reaction force motor 18 integrated with the steering wheel 12. This calculation may be made by an arithmetical calculation or can also be made by a map search calculation. Then, the controller 19 generates the steering torque instruction value of the steering motor 35 based on the calculated steering amount, thereby driving the steering motor 35.

Then, step S25 is performed at the same time that the processing in step S24 is performed or after the processing in step S24 is performed.

<<Step S25>> In step S25, the controller 19 generates the reaction force instruction value based on the steering reaction force of the reaction force motor 18 (the reaction force torque), thereby driving the reaction force motor 18. The steering reaction force is determined by making a predetermined calculation using the reaction force motor rotational angle ($\theta$m), the rack position (Rp), the vehicle speed (Vs), the corrected steering ratio (SRcor), and the like.

Now, the reaction force motor rotational angle ($\theta$m) indicates the basic reaction force, and the basic reaction force corresponding to the reaction force motor rotational angle ($\theta$m) stored in the table is read out. Further, the rack position (Rp) indicates the correction reaction force from the road surface, and the correction reaction force corresponding to the rack position (Rp) stored in the table is read out. Further, a plurality of tables is prepared in correspondence with the vehicle speed (Vs) for each of these tables, and the steering control apparatus is configured in such a manner that the table selected according to the vehicle speed (Vs) is used.

Then, the controller 19 generates the final reaction force torque instruction value with the correction steering ratio (SRcor) reflected in the reaction force resulting from adding the basic reaction force and the correction reaction force, thereby driving the reaction force motor 18. After the end of step S25, the control flow proceeds to RETURN, and the controller 19 is supposed to wait for the next startup timing.

In this manner, the actual steering ratio (SRact), which is the linkage relationship between the steering target wheel 10 and the steering wheel 12, is controlled based on the setting steering ratio (SRset). However, the "mismatch" may occur between the actual steering ratio (SRact) and the setting steering ratio (SRset) due to the emergent avoidance operation. However, in the present embodiment, the steering control apparatus corrects this "mismatch" using the corrected steering ratio (SRcor), thereby improving the consistency of the linkage relationship between the driver's steering operation and the steering target wheel 10, allowing the relationship between the rotational angle of the steering wheel 12 and the steering angle of the steering target wheel 10 to match the steering ratio, and thus reducing the uncomfortable feeling evoked in the driver.

Second Embodiment

Next, a second embodiment based on the basic control flow illustrated in FIG. 6 will be described. This second embodiment is configured to correct the reaction force torque instruction value so as to reduce the mismatch between the actual steering ratio (SRact) and the setting steering ratio (SRset) based on the actual steering ratio (SRact) determined based on the reaction force motor rotational angle ($\theta$m) and the rack position (Rp) and the setting steering ratio (SRset) when a steering operation is performed on the steering wheel by the driver and the steering target wheel 10 reaches the neutral position. In the following description, a control flow thereof will be described with reference to FIG. 7.

<<Step S24>> <<Step S25>> Step S24 and step S25 are similar to the control steps illustrated in FIG. 6, and therefore the descriptions thereof will be omitted here. As described above, step S24 and step S25 are performed when the driver performs a steering operation on the steering wheel 12. After these control steps are performed, the control flow proceeds to step S26.

<<Step S26>> In step S26, the controller 19 determines whether the steering target wheel 10 reaches the neutral position (the straight running state). If the steering target wheel 10 does not reach the neutral position, the control flow returns to step S24 and the controller 19 is supposed to repeat similar operations. On the other hand, if the steering target wheel 10 reaches the neutral position, the control flow proceeds to step S27.

Now, the neutral position of the steering target wheel 10 means that the steering target wheel 10 is steered to neither the left side nor the right side, and the steering target wheel 10 is located at a position that brings the vehicle into the straight running state. The neutral position is defined to include not only the exact neutral position but also even a range where the steering target wheel is slightly steered leftward or rightward as long as the steering target wheel is located substantially at the neutral position.

<<Step S27>> After the steering target wheel 10 reaches the neutral position (the straight running state), the rotational angle of the steering wheel 12 and the steering angle of the steering target wheel 10 should be returned to the setting steering ratio (SRset).

For this purpose, in step S27, the controller 19 corrects the torque instruction value of the reaction force motor 18 so as to reduce the "mismatch" between the actual steering ratio (SRact) and the setting steering (SRset) based on the actual steering ratio (SRact) determined based on the rack position (Rp) and the reaction force motor rotational angle ($\theta$m) and the setting steering (SRset). In this case, the torque instruction value of the reaction force motor 18 is corrected so as to make the actual steering ratio (SRact) closer to the setting steering (SRset).

Then, when the steering wheel 12 is displaced from the neutral position although the steering target wheel 10 is located at the neutral position and the vehicle is currently running straight, steering the steering target wheel 10 according to the position of the steering wheel 12 may cause the vehicle to start turning unintentionally, thereby causing a mismatch between the driver's intention about the steering operation and the behavior of the vehicle.

In such a case, the running operation in conformity with the driver's intention can be achieved by adjusting the rotational position on the steering wheel 12 side instead of the steering target wheel 10 side.

When the "mismatch" is reduced, the driver's uncomfortable feeling toward the steering of the steering wheel 12 can be further reduced by changing the reaction force torque instruction value realizing the setting steering (SRset), preferably, gradually according to a temporal function, instead of changing it in a stepwise manner.

Third Embodiment

Next, a third embodiment based on the basic control flow illustrated in FIG. 6 will be described. This third embodiment is configured to correct the steering torque instruction value so as to reduce the mismatch between the actual steering ratio and the setting steering ratio based on the actual steering ratio (SRact) determined based on the reaction force motor rotational angle ($\theta$m) and the rack position (Rp) and the setting steering ratio (SRset) when a steering operation is performed on the steering wheel by the driver and the steering target wheel 10 reaches the neutral position. In the following description, a control flow thereof will be described with reference to FIG. 8.

Figure 7:
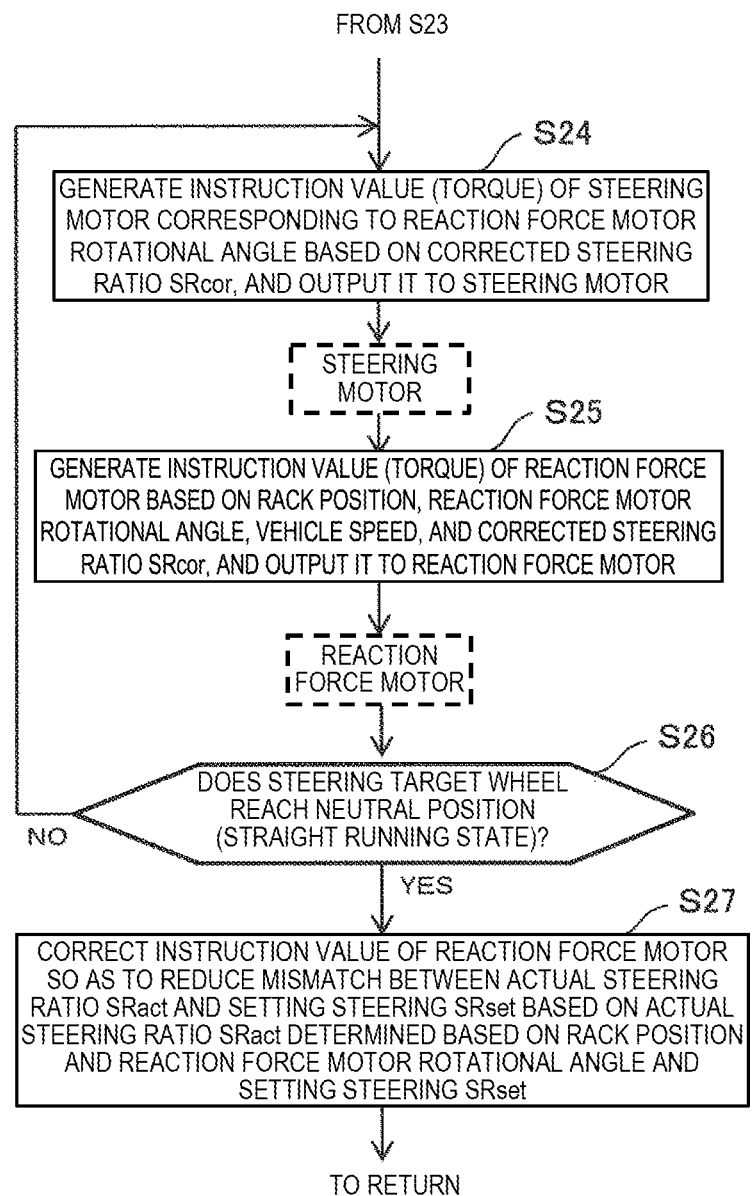
FIG. 7 is a control flowchart illustrating main portions of a second embodiment based on the basic control flow illustrated in FIG. 6.

<<Step S24>> <<Step S25>> <<Step S26>> Step S24, step S25, and step S26 are similar to the control steps illustrated in FIG. 7, and therefore the descriptions thereof will be omitted here. As described above, these step S24, step S25, and step S26 are performed when the driver performs a steering operation on the steering wheel 12. After these control steps are performed, the control flow proceeds to step S28.

<<Step S28>> After the steering target wheel 10 reaches the neutral position (the straight running state), the rotational angle of the steering wheel 12 and the steering angle of the steering target wheel 10 should be returned to the setting steering ratio (SRset).

For this purpose, in step S28, the controller 19 corrects the torque instruction value of the steering motor 35 so as to reduce the "mismatch" between the actual steering ratio (SRact) and the setting steering (SRset) based on the actual steering ratio (SRact) determined based on the rack position (Rp) and the reaction force motor rotational angle ($\theta$m) and the setting steering (SRset). In this case, the torque instruction value of the steering motor 35 is corrected so as to make the actual steering ratio (SRact) closer to the setting steering (SRset).

Then, when the steering wheel 12 is displaced from the neutral position although the steering target wheel 10 is located at the neutral position and the vehicle is currently running straight, the mismatch may occur between the driver's steering operation and the behavior of the vehicle. In such a case, the running operation in conformity with the driver's intention can be achieved by adjusting the steering angle on the steering target wheel 10 side. In other words, the steering target wheel 10 is controlled according to the operation on the steering wheel 12 operated by the driver.

Also in this case, when the "mismatch" is reduced, the driver's uncomfortable feeling toward the steering of the steering wheel 12 can be further reduced by changing the steering torque instruction value realizing the setting steering (SRset), preferably, gradually according to a temporal function, instead of changing it in a stepwise manner.

Fourth Embodiment

Next, a fourth embodiment based on the control flow illustrated in FIG. 8 will be described. This fourth embodiment is a modification example of the third embodiment, and is an example when the rotational direction of the steering wheel 12 and the steering direction of the steering target wheel 10 according to the external steering instruction value (Adas) are different and opposite in phase from each other. This example corresponds to control in which the reaction force torque instruction value is not fed to the reaction force motor 18. In the following description, a control flow thereof will be described with reference to FIG. 9.

<<Step S29>> In step S29, the controller 19 determines whether the rotational direction of the reaction force motor 18 and the steering direction of the steering target wheel 10 are the same directions or opposite directions. Such a determination is made because it is assumed that the external steering instruction value (Adas) from the autonomous steering system 27 may be different from the rotational direction of the steering wheel 12.

If the rotational direction of the reaction force motor and the steering direction of the steering target wheel 10 are determined to be the same directions in step S29, the control flow proceeds to step S24. If the rotational direction of the reaction force motor and the steering direction of the steering target wheel 10 are determined to be opposite directions in step S29, the control flow proceeds to step S30.

Figure 8:
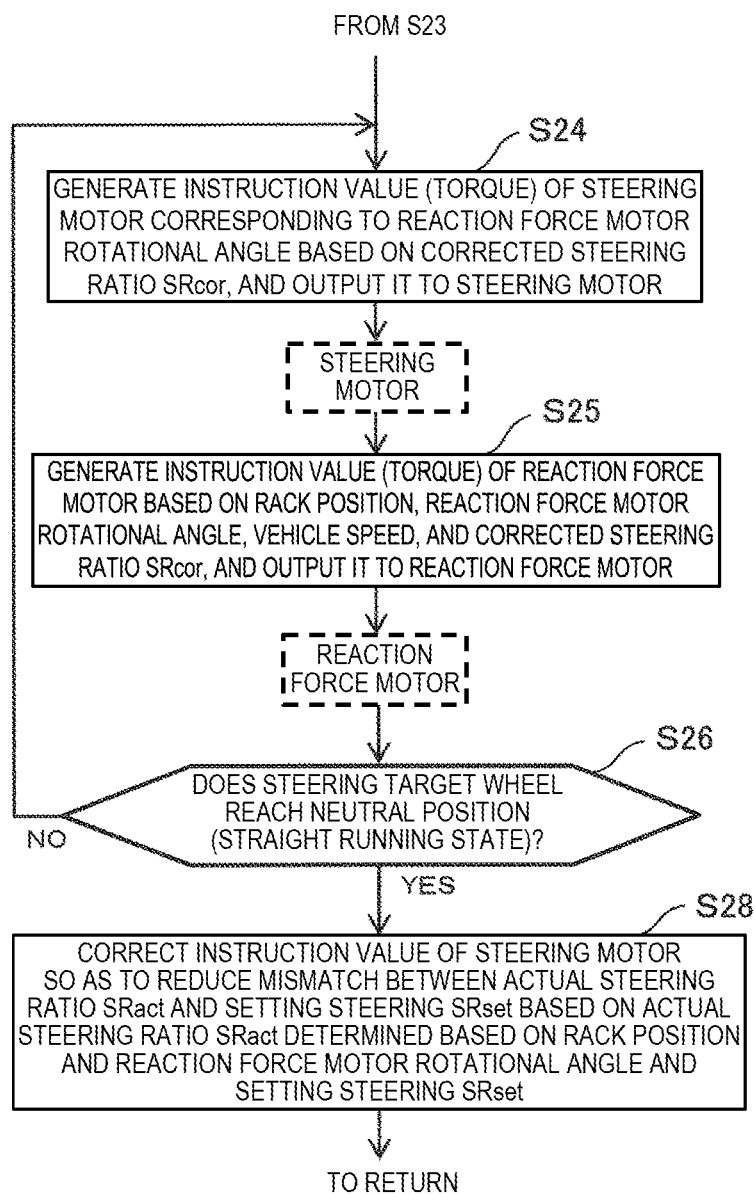
FIG. 8 is a control flowchart illustrating main portions of a third embodiment based on the basic control flow illustrated in FIG. 6.

<<Step S24>> <<Step S25>> Step S24 and step S25 are similar to the control steps illustrated in FIG. 8, and therefore the descriptions thereof will be omitted here.

<<Step S26>> <<Step S28>> Step S26 and step S28 are also similar to the control steps illustrated in FIG. 8, and therefore the descriptions thereof will be omitted here.

<<Step S30>> In step S30, the controller 19 determines the rotational angle of the steering motor 35 (the steering amount) based on the corrected steering ratio (SRcor). The rotational angle of the steering motor 35 (the steering amount) is calculated, for example, in such a manner that this rotational angle satisfies the corrected steering ratio (SRcor) with respect to the rotational angle of the reaction force motor 18 integrated with the steering wheel 12. Then, the controller 19 generates the steering torque instruction value of the steering motor 35 based on the calculated steering amount, thereby driving the steering motor 35. This is the same processing as step S24. After this processing is ended, the control flow proceeds to step S31.

<<Step S31>> In step S26, the controller 19 determines whether the steering target wheel 10 reaches the neutral position (the straight running state). If the steering target wheel 10 does not reach the neutral position, the control flow returns to step S31 and the controller 19 is supposed to repeat similar operations. On the other hand, if the steering target wheel 10 reaches the neutral position, the control flow proceeds to step S32.

<<Step S32>> After the steering target wheel 10 reaches the neutral position (the straight running state), the rotational angle of the steering wheel 12 and the steering angle of the steering target wheel 10 should be returned to the setting steering ratio (SRset).

For this purpose, in step S32, the controller 19 corrects the torque instruction value of the steering motor 35 so as to reduce the "mismatch" between the actual steering ratio (SRact) and the setting steering (SRset) based on the actual steering ratio (SRact) determined based on the rack position (Rp) and the reaction force motor rotational angle (θm) and the setting steering (SRset).

If the position of the steering wheel 12 is adjusted so as to match the steering angle of the steering wheel 10 when the rotational direction of the steering wheel 12 and the steering direction of the steering wheel 10 are opposite directions in opposite phase, this leads to a rotation of the steering wheel 12 to the opposite side across the neutral position, thereby resulting in an increase in the driver's uncomfortable feeling toward the steering.

Therefore, the steering angle on the steering target wheel 12 side is adjusted using the steering motor 35 when the rotational direction of the steering wheel 12 and the steering direction of the steering target wheel 10 are in opposite phase, like the present modification example, by which the driver's unconformable feeling toward the steering can be reduced.

Figure 9:
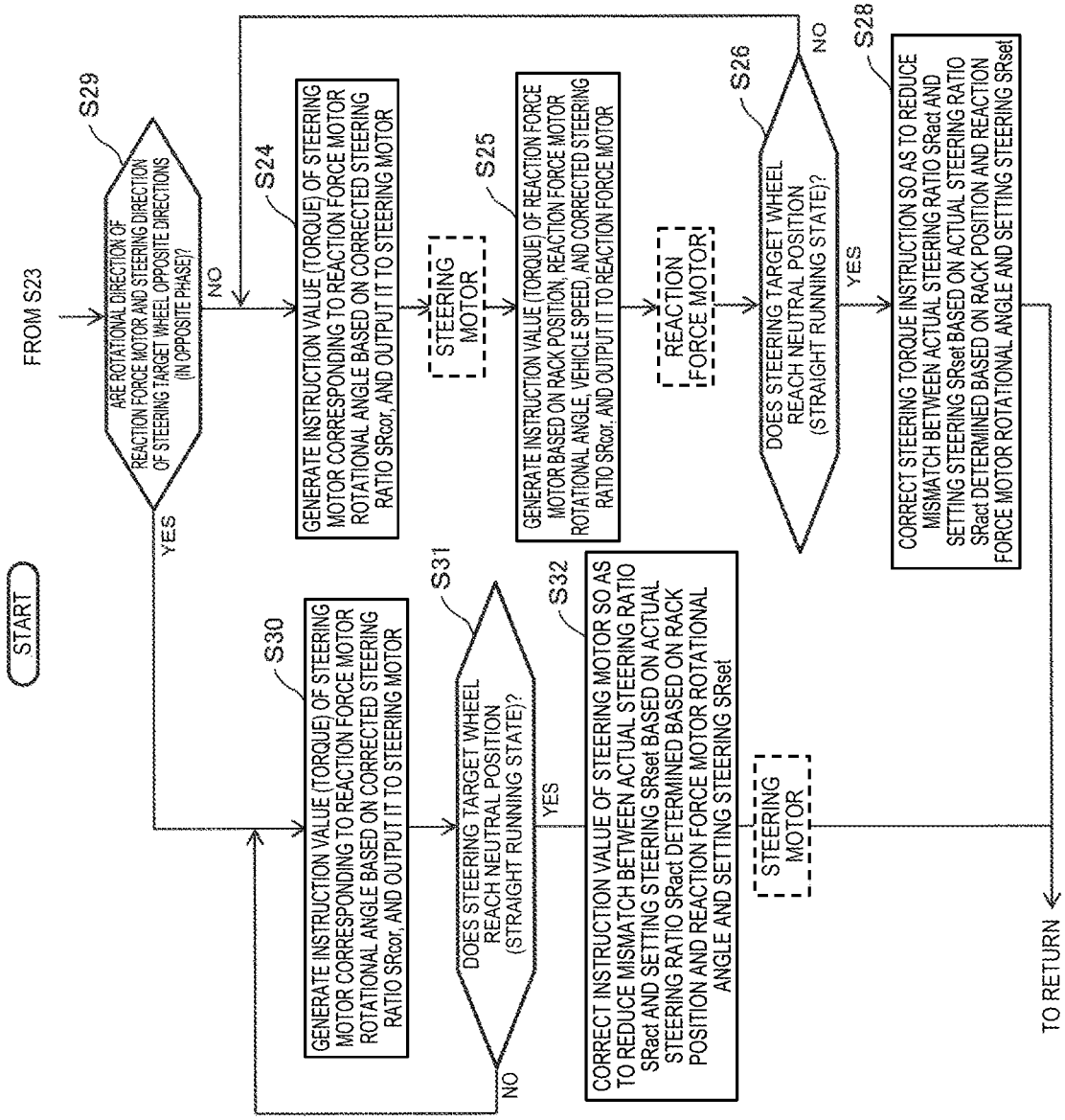
FIG. 9 is a control flowchart illustrating main portions of a fourth embodiment based on the basic control flow illustrated in FIG. 6.

Further, the present embodiment is a modification example of the embodiment illustrated in FIG. 8, but may be configured as a modification example of the embodiment illustrated in FIG. 7. In this case, the control steps after "NO" is determined in FIG. 9 are replaced with the control steps illustrated in FIG. 7. In this case, the rotational angle of the steering wheel 12 can be corrected so as to match the steering angle of the steering target wheel 10 by adjusting the reaction force torque instruction value of the reaction force motor 18 when the operation directions of the steering target wheel 10 and the steering wheel 12 are the same directions, and the steering angle of the steering target wheel 10 can be corrected so as to match the rotational angle of the steering wheel 12 by adjusting the steering torque instruction value of the steering motor 35 when the operation directions of the steering target wheel 10 and the steering wheel 12 are opposite directions.

Therefore, the occurrence of a running operation contrary to the driver's steering operation and the deterioration of the steering operation feeling can be reduced by selecting the adjustment method suitable to the running situation of the vehicle. Parameters that can be taken into consideration to determine the running situation of the vehicle include the vehicle speed, the steering operation amount, the rack position, the steering operation direction of the steering operation shaft, the steering direction of the steering target wheel, the relationship between the steering direction of the steering operation shaft and the steering direction of the steering target wheel (the same directions or opposite directions), and the like.

Fifth Embodiment

Figure 10:
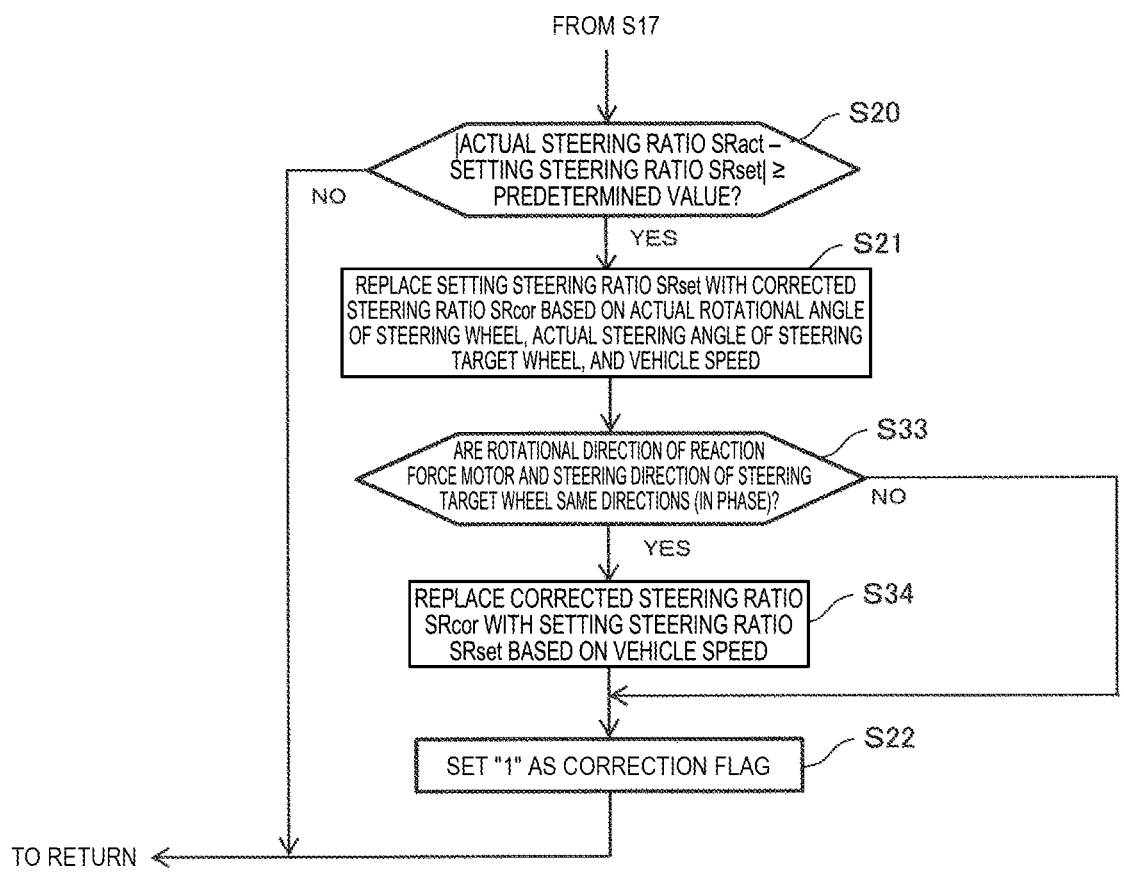
FIG. 10 is a control flowchart illustrating main portions of a fifth embodiment based on the basic control flow illustrated in FIG. 6.

Next, a fifth embodiment based on the control flow illustrated in FIG. 6 will be described. This fifth embodiment is characterized by being configured to return the steering ratio from the corrected steering ratio (SRcor) to the setting steering ratio (SRset) when the rotational direction of the steering wheel 12 and the steering direction of the steering target wheel 10 are the same directions in phase with each other. In the following description, a control flow thereof will be described with reference to FIG. 10.

<<Step S20>> <<Step S21>> Step S20 and step S21 are similar to the control steps illustrated in FIG. 6, and therefore the descriptions thereof will be omitted here.

<<Step S33>> In step S33, the controller 19 determines whether the rotational direction of the reaction force motor 18 and the steering direction of the steering target wheel 10 are the same directions or opposite directions If the rotational direction of the reaction force motor and the steering direction of the steering target wheel 10 are determined to be the same directions in step S33, the control flow proceeds to step S34. If the rotational direction of the reaction force motor and the steering direction of the steering target wheel 10 are determined to be opposite directions in step S33, the control flow proceeds to step S22, in which "1" is set as the correction flag.

<<Step S34>> In step S34, the controller 19 performs processing for replacing the corrected steering ratio (SRcor) set in step S21 with the setting steering ratio (SRset) determined based on the vehicle speed (Vs). After the steering ratio is replaced with the setting steering ratio (SRset), the control flow proceeds to step S22, in which "1" is set as the correction flag.

This means that the setting steering ratio (SRset) with which the corrected steering ratio (SRcor) is replaced in step S34 is reflected in the torque instruction value of the steering motor 35 and the torque instruction value of the reaction force motor 18 determined in step S24 and step S25 in the next startup timing subsequent thereto.

In this manner, the present embodiment is configured to return the setting steering ratio from the corrected steering ratio (SRcor) to the setting steering ratio (SRset) if the steering operation direction of the steering wheel 12 and the steering direction of the steering target wheel 10 are same directions when the steering ratio is corrected from the setting steering ratio (SRset) to the corrected steering ratio (SRcor) according to the occurrence of the mismatch between the actual steering ratio (SRact) and the setting steering ratio (SRset).

For example, the corrected steering ratio (SRcor) changed due to the execution of the emergent avoidance operation of the vehicle may be different from the originally intended setting steering ratio suitable to the running situation. Therefore, the steering control can be performed with the steering ratio suitable to the running situation by returning the steering ratio from the corrected steering ratio (SRcor) to the setting steering ratio (SRset).

Changing the steering ratio again in this manner may cause the driver to feel uncomfortable toward the steering, but the steering ratio is changed so as to be returned to the setting steering ratio (SRset) when the steering operation direction of the steering wheel 12 and the steering direction of the steering target wheel 10 are the same directions. Therefore, the driver's uncomfortable feeling toward the steering can be reduced even by changing the steering wheel 12 and/or the steering target wheel 10 to change the setting steering ratio.

Sixth Embodiment

Figure 11:
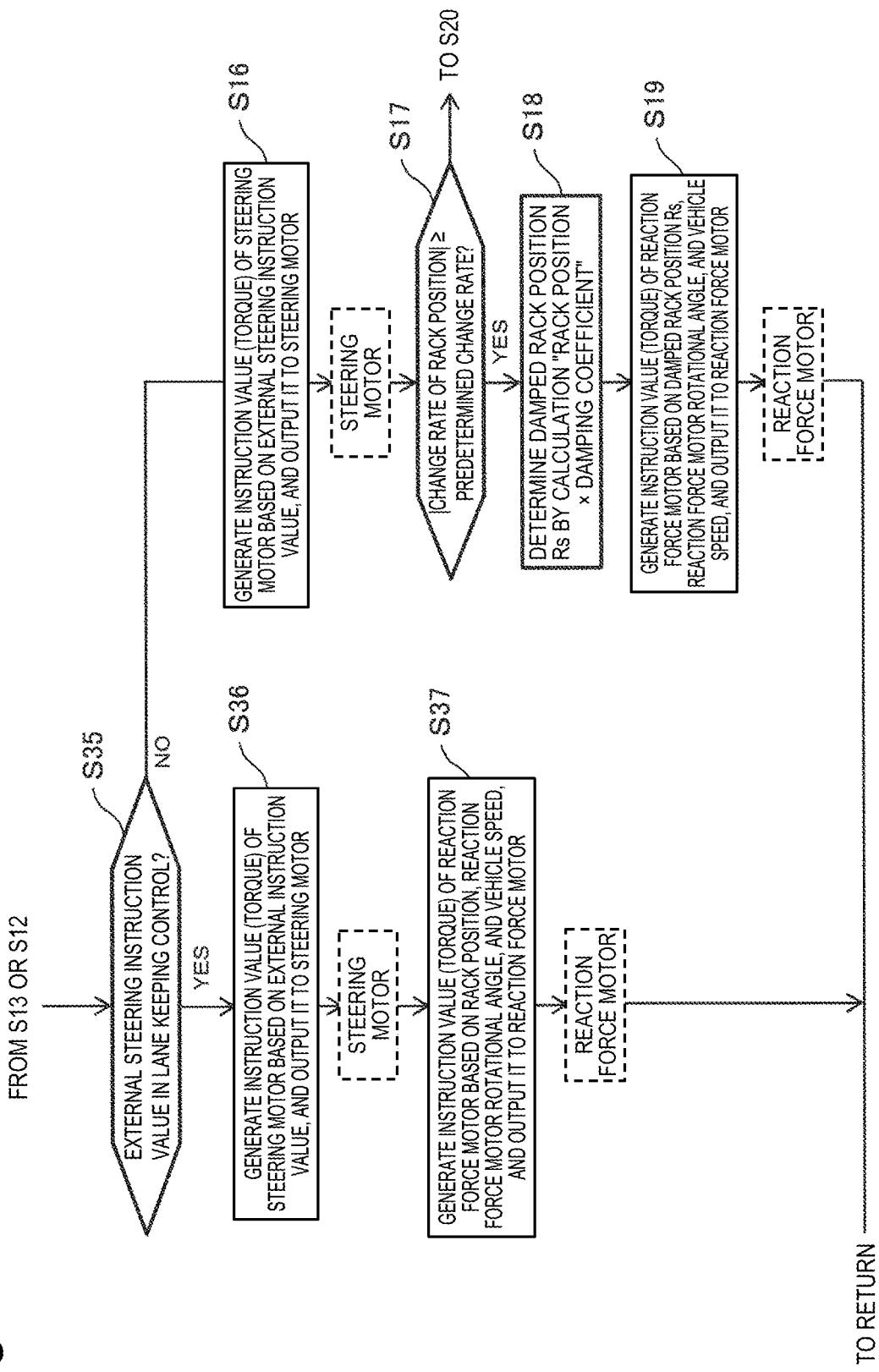
FIG. 11 is a control flowchart illustrating main portions of a sixth embodiment based on the basic control flow illustrated in FIG. 6.

Next, a sixth embodiment based on the control flow illustrated in FIG. 6 will be described. This sixth embodiment is characterized by being configured to refrain from reflecting the external steering instruction value (Adas) in the reaction force motor 18 when the lane keeping control is in operation as the autonomous steering control. In the following description, a control flow thereof will be described with reference to FIG. 11.

<<Step S35>> In step S35, the controller 19 determines whether the lane keeping control is in operation at the present moment based on the control information of the external steering system 27. If the lane keeping control is determined to be in operation, the control flow proceeds to step S36. If the lane keeping control is determined to be out of operation, the control flow proceeds to step S16. <<Step S16>> to <<Step S19>> <<Step S16>> to <<step S19>> are similar to the control steps illustrated in FIG. 6, and therefore the descriptions thereof will be omitted here.

<<Step S36>> If the lane keeping control is determined to be in operation in step S35, in step S36, the controller 19 performs a steering operation required for this lane keeping control because the external steering instruction value (Adas) is input due to the lane keeping control. This steering operation is performed independently of the steering operation on the steering wheel 12, and the steering torque instruction value of the steering motor 35 is determined based on the steering amount corresponding to the external steering instruction value (Adas) in this case.

It is apparent that the final steering torque instruction value of the steering motor 35 may also be set by adding the steering torque instruction value of the steering motor 35 corresponding to the rotational angle of the steering wheel 12 (the rotational angle of the reaction force motor) to the steering torque instruction value of the steering motor 35 corresponding to the external steering instruction value (Adas) in this case. After the steering motor 35 is driven and the lane keeping control is performed, the control flow proceeds to step S37.

<<Step S37>> In step S37, the controller 19 generates the reaction force instruction value based on the steering reaction force of the reaction force motor 18 (the reaction force torque), thereby driving the reaction force motor 18. The reaction force instruction value is determined by making a predetermined calculation using the reaction force motor rotational angle ($\theta$m), the rack position (Rp), the vehicle speed (Vs), and the like.

Also in this case, the reaction force motor rotational angle ($\theta$m) indicates the basic reaction force, and the rotational angle and the basic reaction force are stored in the table and the basic reaction force corresponding to the rotational angle is read out. Further, the rack position (Rp) indicates the correction reaction force from the road surface, and the rack position (Rp) and the correction reaction force are stored in the table and the correction reaction force corresponding to the rack position (Rp) is read out. Further, a plurality of tables is prepared in correspondence with the vehicle speed (Vs) for each of these tables, and the steering control apparatus is configured in such a manner that the table selected according to the vehicle speed (Vs) is used.

Now, the rack position (Rp) is damped by, for example, multiplying the rack position (Rp) by the damping coefficient or subtracting the external steering instruction value (Adas) in step S19, but the rack position (Rp) is directly used without being multiplied by the damping coefficient or without the external steering instruction value (Adas) subtracted therefrom in step S37 in the present embodiment.

Then, the controller 19 generates the final reaction force torque instruction value with the setting steering ratio (SRset) reflected in the reaction force resulting from adding the basic reaction force and the correction reaction force, thereby driving the reaction force motor 18. After the end of step S15, the control flow proceeds to RETURN, and the controller 19 is supposed to wait for the next startup timing.

In this manner, the present embodiment is configured to generate the reaction force torque instruction value based on at least the rack position (Rp) when receiving the external steering instruction value (Adas) for performing the lane keeping control so as to prevent the vehicle from departing from inside the traffic lane where the vehicle is running.

During the lane keeping control, the vehicle is mildly steered along the traffic lane, and therefore the subtraction of the amount corresponding to the change in the rack position (Rp) based on the damping coefficient or the external steering instruction value (Adas) is little necessary. Therefore, the "mismatch" between the actual steering ratio (SRact) and the setting steering ratio (SRset) is reduced and the inconsistency of the linkage relationship between the driver's steering operation and the steering target wheel 10 is improved, as a result of which the uncomfortable feeling evoked in the driver is reduced.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2019-182855 filed on Oct. 3, 2019. The entire disclosure of Japanese Patent Application No. 2019-182855 filed on Oct.

3, 2019 including the specification, the claims, the drawings, and the abstract is incorporated herein by reference in its entirety.

REFERENCE SIGNS LIST 10 steering target wheel
12 steering wheel
13 steering operation shaft
14 reaction force motor rotational angle sensor (steering operation amount sensor)
15 reaction force motor current sensor
17 steering shaft
18 reaction force electric motor
19 control device
22 rack position sensor (steering amount sensor)
27 autonomous steering system
35 steering electric motor
62 steering ratio generation portion
63 steering ratio correction portion
65 steering ratio adjustment method selection portion
66 steering instruction value generation portion
67 reaction force instruction value generation portion

The invention claimed is:

1. A steering control apparatus comprising:
a steering operation shaft configured to be rotated according to a rotation of a steering wheel and mechanically disconnected from a steering target wheel;
a reaction force actuator configured to apply a steering reaction force to the steering operation shaft;
a steering actuator configured to generate a steering force for steering the steering target wheel;
a steering member configured to transmit the steering force of the steering actuator to the steering target wheel to steer the steering target wheel;
a steering operation amount sensor configured to detect a steering operation amount of the steering operation shaft and output a steering operation amount signal, which is a signal regarding the steering operation amount;
a steering amount sensor configured to detect a steering state of the steering target wheel and output a steering amount signal, which is a signal regarding the steering state; and
a control device configured to drive and control the reaction force actuator and the steering actuator based on at least the signals detected by the steering operation amount sensor and the steering amount sensor,
wherein the control device includes at least an external steering instruction value reception portion, a setting steering ratio generation portion, a steering instruction value generation portion, a reaction force instruction value generation portion, and a setting steering ratio correction portion,
wherein the external steering instruction value reception portion receives an external steering instruction value generated according to a driving situation of a vehicle,
wherein the setting steering ratio generation portion generates a setting steering ratio, which is a ratio of a change amount of the steering amount to a change amount of the steering operation amount, based on a vehicle speed,
wherein the steering instruction value generation portion generates a steering instruction value for driving and controlling the steering actuator based on the external steering instruction value, a basic steering instruction value based on the steering operation amount, and the setting steering ratio,
wherein the reaction force instruction value generation portion generates a reaction force instruction value for driving and controlling the reaction force actuator based on a damped steering amount determined by multiplying the steering amount that is actually acquired by a predetermined damping coefficient, or a damped steering amount determined by subtracting a part of an amount corresponding to a change in the steering amount corresponding to the external steering instruction value or a whole of the amount corresponding to the change in the steering amount corresponding to the external steering instruction value from the steering amount that is actually acquired, and
wherein, if a mismatch occurs between an actual steering ratio determined based on the steering instruction value and the reaction force instruction value and the setting steering ratio when the reaction force instruction value generation portion generates the reaction force instruction value, the setting steering ratio correction portion corrects the setting steering ratio to a corrected steering ratio based on the actual steering ratio so as to reduce this mismatch.

2. The steering control apparatus according to claim 1, wherein the reaction force instruction value generation portion corrects the reaction force instruction value so as to reduce the mismatch between the actual steering ratio and the setting steering ratio when the steering target wheel is located at a neutral position.

3. The steering control apparatus according to claim 1, wherein the steering instruction value generation portion corrects the steering instruction value so as to reduce the mismatch between the actual steering ratio and the setting steering ratio when the steering target wheel is located at a neutral position.

4. The steering control apparatus according to claim 3, wherein the steering instruction value generation portion corrects the steering instruction value so as to reduce the mismatch between the actual steering ratio and the setting steering ratio when a steering operation direction of the steering operation shaft and a steering direction of the steering target wheel are opposite directions in opposite phase.

5. The steering control apparatus according to claim 1, wherein the reaction force instruction value generation portion or the steering instruction value generation portion corrects the reaction force instruction value or the steering instruction value in such a manner that the mismatch between the actual steering ratio and the setting steering ratio gradually reduces.

6. The steering control apparatus according to claim 1, wherein the control device further includes an actual steering ratio adjustment method selection portion, and
wherein the actual steering ratio adjustment method selection portion selects which to correct, the reaction force instruction value or the steering instruction value according to a running situation of the vehicle when reducing the mismatch between the actual steering ratio and the setting steering ratio.

7. The steering control apparatus according to claim 1, wherein, if a steering operation direction of the steering operation shaft and a steering direction of the steering target wheel are the same directions when the steering ratio is corrected from the setting steering ratio to the corrected steering ratio in correspondence with the actual steering ratio according to the occurrence of the mismatch between the actual steering ratio and the setting steering ratio, which is a relationship between the steering operation amount of the steering operation shaft and the steering amount of the steering target wheel, the setting steering ratio correction portion performs processing for returning the steering ratio from the corrected steering ratio to the setting steering ratio.

8. The steering control apparatus according to claim 1, wherein the setting steering ratio correction portion corrects the setting steering ratio to the corrected steering ratio in such a manner that the mismatch occurring between the actual steering ratio and the setting steering ratio reduces when the external steering instruction value reception portion receives the external steering instruction value for allowing the vehicle to avoid a collision with an obstacle.

9. The steering control apparatus according to claim 1, wherein the reaction force instruction value generation portion generates the reaction force instruction value based on the steering amount when the external steering instruction value reception portion receives the external steering instruction value for performing lane keeping control so as to prevent the vehicle from departing from inside a traffic lane where the vehicle runs.

* * * * *